Oct. 31, 1950     J. E. DAYGER ET AL     2,528,427
RECORD FEEDING DEVICE

Filed June 12, 1948     15 Sheets-Sheet 1

Inventors
J. E. DAYGER
O. B. SHAFER
By J. W. Armbruster
Attorney

Oct. 31, 1950   J. E. DAYGER ET AL   2,528,427
RECORD FEEDING DEVICE

Filed June 12, 1948                            15 Sheets-Sheet 2

REPRESENTATIVE COMPANY INVOICE
CITY, STATE

| | | | | | | |
|---|---|---|---|---|---|---|
| SOLD TO | FRANK A JONES 136 BROADWAY NEW YORK N Y | | | | INVOICE NO. | 13471 |
| SHIP TO | BROWNES HARDWARE STORE 217 MORROW AVE NEW YORK N Y | | | | INVOICE DATE | 10 03 46 MO. DAY YEAR |

| SHIPPING INSTRUCTIONS | TERMS | SALESMAN | CUST. ORD. NO. | CUST. ORDER DATE |
|---|---|---|---|---|
| TRUCK PREPAID VIA SMITH | 2% 10 DAYS NET 30 | 222 | 8072 | 9 23 |

| QUANTITY | UNIT | DESCRIPTION | STOCK NO. | PRICE | AMOUNT |
|---|---|---|---|---|---|
| 17 | DOZ | RAKE BAMBOO | 3605 | 11 76 | 199 92 |
| 20 | DOZ | HOSE GARDEN | 3302 | 63 00 | 1260 00 |
| 12 | DOZ | SHOVEL COAL | 5706 | 46 32 | 555 84 |
| 12 | DOZ | SHOVEL SNOW | 1103 | 53 76 | 645 12 |
| 28 | PKG | SANDPAPER 6 BY 6 | 4107 | 2 50 | 70 00 |
| 25 | BOX | BULBS 100 WATTS | 1105 | 1 80 | 45 00 |
| 500 | YD | OIL CLOTH 34 IN | 2106 | 30 | 90 00 |
| | | | | * | 2865 88 |

ASTERISK (*) INDICATES TOTAL

REPRESENTATIVE COMPANY INVOICE
CITY, STATE

| | | | | | | |
|---|---|---|---|---|---|---|
| SOLD TO | WILLIAM B SMITH 1446 CAMP ST CHICAGO ILL | | | | INVOICE NO. | 13472 |
| SHIP TO | | | | | INVOICE DATE | 10 03 46 MO. DAY YEAR |

| SHIPPING INSTRUCTIONS | TERMS | SALESMAN | CUST. ORD. NO. | CUST. ORDER DATE |
|---|---|---|---|---|
| TRUCK PREPAID VIA JONES | 2% 10 DAYS NET 30 | 268 | 9111 | 9 29 |

| QUANTITY | UNIT | DESCRIPTION | STOCK NO. | PRICE | AMOUNT |
|---|---|---|---|---|---|
| 35 | BOX | TACKS THUMB | 4108 | 1 20 | 42 00 |
| 12 | DOZ | SPRINKLERS | 3604 | 31 20 | 374 |
| 5 | DOZ | RAKE STEEL | 2110 | | |
| 5 | DOZ | SHOVELS | | | |
| 6 | BOX | TACKS | | | |

FIG. 2.

INVENTORS
J. E. DAYGER
BY O. B. SHAFER
J. W. Armbruster
ATTORNEY

Oct. 31, 1950     J. E. DAYGER ET AL     2,528,427
RECORD FEEDING DEVICE
Filed June 12, 1948     15 Sheets-Sheet 3
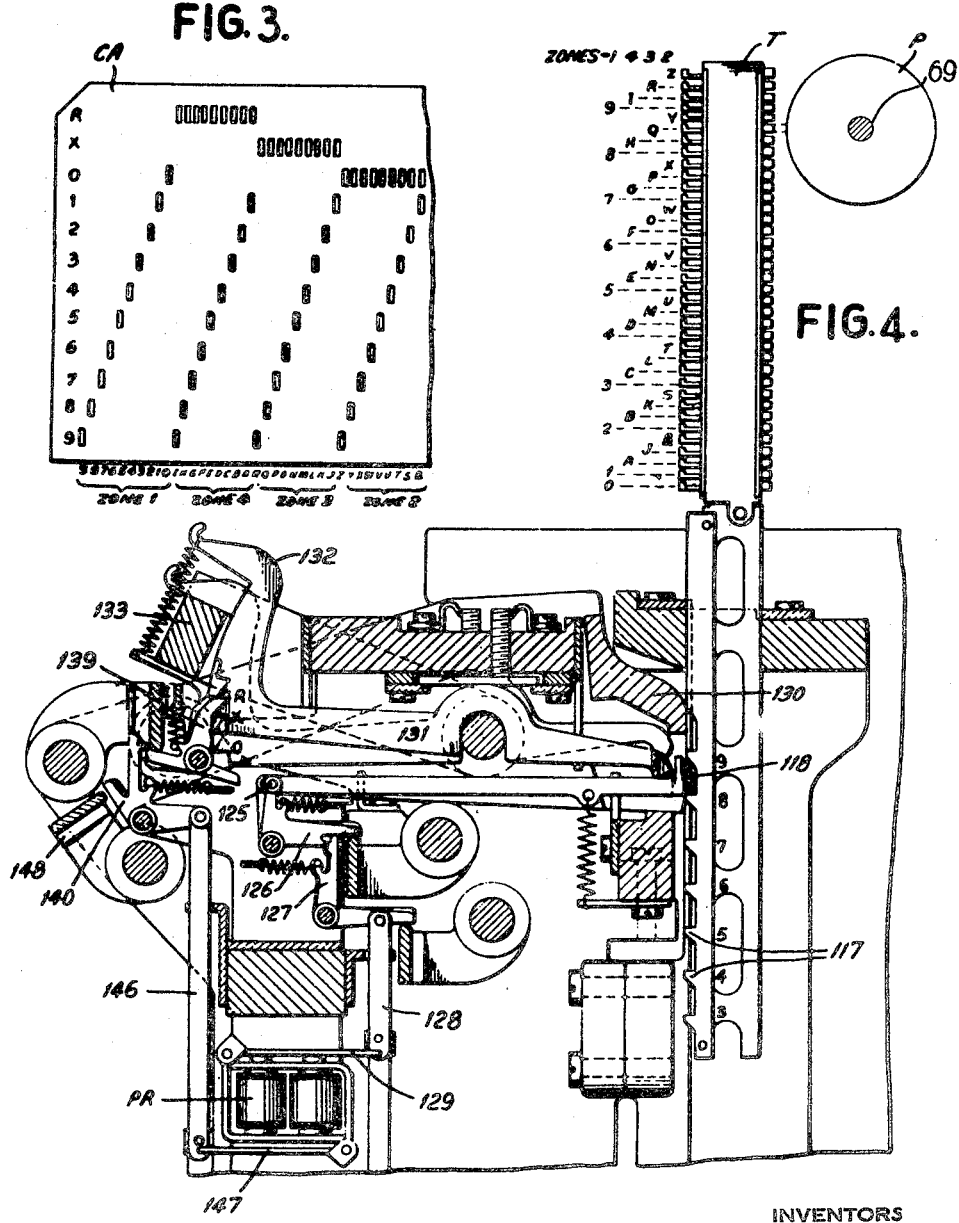
INVENTORS
J. E. DAYGER
O. B. SHAFER
BY
ATTORNEY

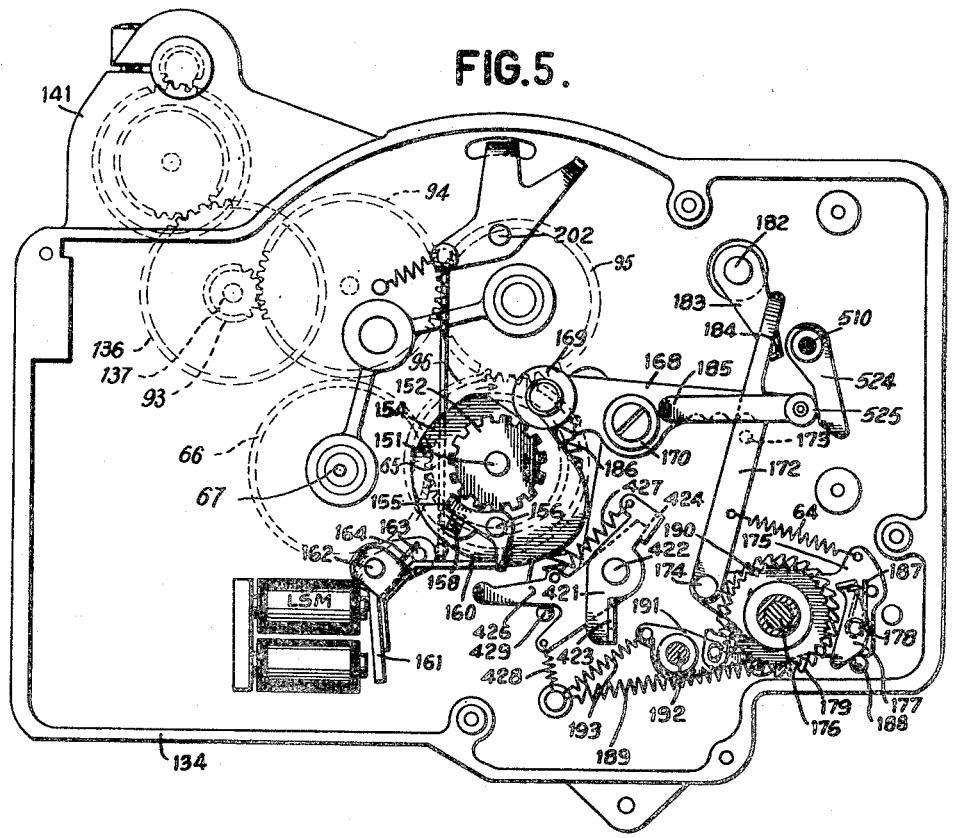

Oct. 31, 1950  J. E. DAYGER ET AL  2,528,427
RECORD FEEDING DEVICE

Filed June 12, 1948  15 Sheets-Sheet 5

INVENTORS
J. E. DAYGER
O. B. SHAFER
BY
J. W. Armbruster
ATTORNEY

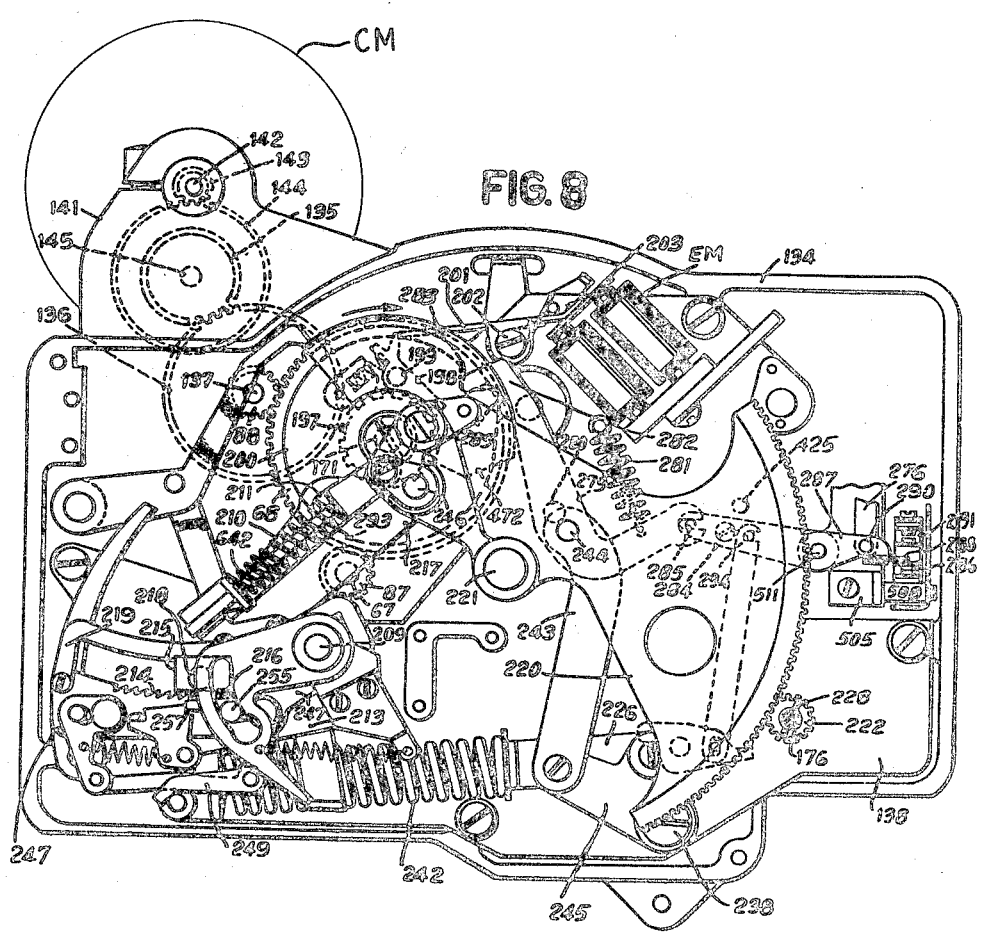

Oct. 31, 1950     J. E. DAYGER ET AL     2,528,427
RECORD FEEDING DEVICE

Filed June 12, 1948     15 Sheets-Sheet 9

INVENTORS
J. E. DAYGER
O. B. SHAFER
BY J. W. Armbruster
ATTORNEY

Patented Oct. 31, 1950

2,528,427

UNITED STATES PATENT OFFICE 2,528,427

RECORD FEEDING DEVICE

Jonas E. Dayger, Binghamton, and Orville B. Shafer, Owego, N. Y., assignors to International Business Machines Corporation, New York, N. Y., a corporation of New York Application June 12, 1948, Serial No. 32,568

8 Claims. (Cl. 101—93)

This invention relates generally to improved record feeding devices and more particularly to automatic means for skipping selected spaces of a plurality of heading spaces under control of machine control records. The main purpose is to so space a record form as to present at the printing line a certain one of several heading spaces, said space being related to a certain heading card that is to control printing in that space.

An object of the invention is to provide means for automatically printing in, or skipping over any of a plurality of heading spaces which are blocked off at the top of each form on a preprinted continuous record strip. The device is controlled by record cards arranged in groups of related heading and detail cards; the heading cards of a group being further subdivided into a plurality of heading sets, each set bearing data for separate identification such as that of a buyer, retailer or wholesaler, and instructions such as shipping instructions. The purpose is to skip those heading areas devoted to certain classes of heading data when the related cards are missing. There is also a requirement to skip all heading areas when there is an overflow of items or detail data from the bottom of one bill to the top of the body area of the next bill form, i. e., when the number of data lines in the body area is not sufficient for the number of related detail records.

Another object of the invention is to provide electrical devices under joint control of heading cards and an automatic carriage for feeding record material with line space skipping operations between and over heading areas on forms on said material. Relay devices are provided and controlled according to the presence or absence of heading cards and the change from heading to detail cards. Other relay devices cooperate therewith and time the successive or seriatim reactivations of the line space devices to advance the record sheet to jump over one or more heading spaces. Mechanical means are provided to break the line spacing control circuit at a plurality of heading start lines, but these breaks are shunted selectively and successively by the relays for detecting the absence of heading card groups.

Assuming that there are provisions for only three heading recordings A, B and C and that variations are to be expected in the appearance of control cards for B and C, and that overflow conditions are to be taken care of; then the machine is to automatically carry on the following operations:

1. Print all headings (A, B and C).
2. Print headings A and B; skip C.
3. Print headings A and C; skip B.
4. Print heading A; skip B and C.
5. Skip all headings on an overflow.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 shows an example of bill form portions of a record strip printed under control of the first and second groups of cards shown in Fig. 1.

Fig. 3 shows a portion of the control record as it is perforated in code to represent the various digit and alphabet data.

Fig. 4 is a sectional elevation view showing the numeral and alphabet printing mechanism.

Fig. 5 is an elevation view of the line space control mechanism.

Fig. 8 is an elevation view of the mechanism for controlling ejection for moving the record strip from form to form with a long feeding operation.

Figs. 9a–9i when taken together form a wiring diagram of pertinent portions of the tabulating machine and automatic carriage, with the special control wiring shown in heavy lines.

The feeding controls are illustrated in coordination with a record controlled alphabet printing tabulator. The printing machine is of the kind shown in Patents Nos. 2,079,418 and 2,111,122 and application Serial No. 609,854, filed on August 9, 1945, wherein mechanisms are shown for feeding record cards one by one and analyzing the cards electrically to control the setting of type bars and the accumulation of amounts and total printing of such amounts. The automatic strip feeding carriage is of the kind described in detail in Patent No. 2,189,025.

Figure 1:
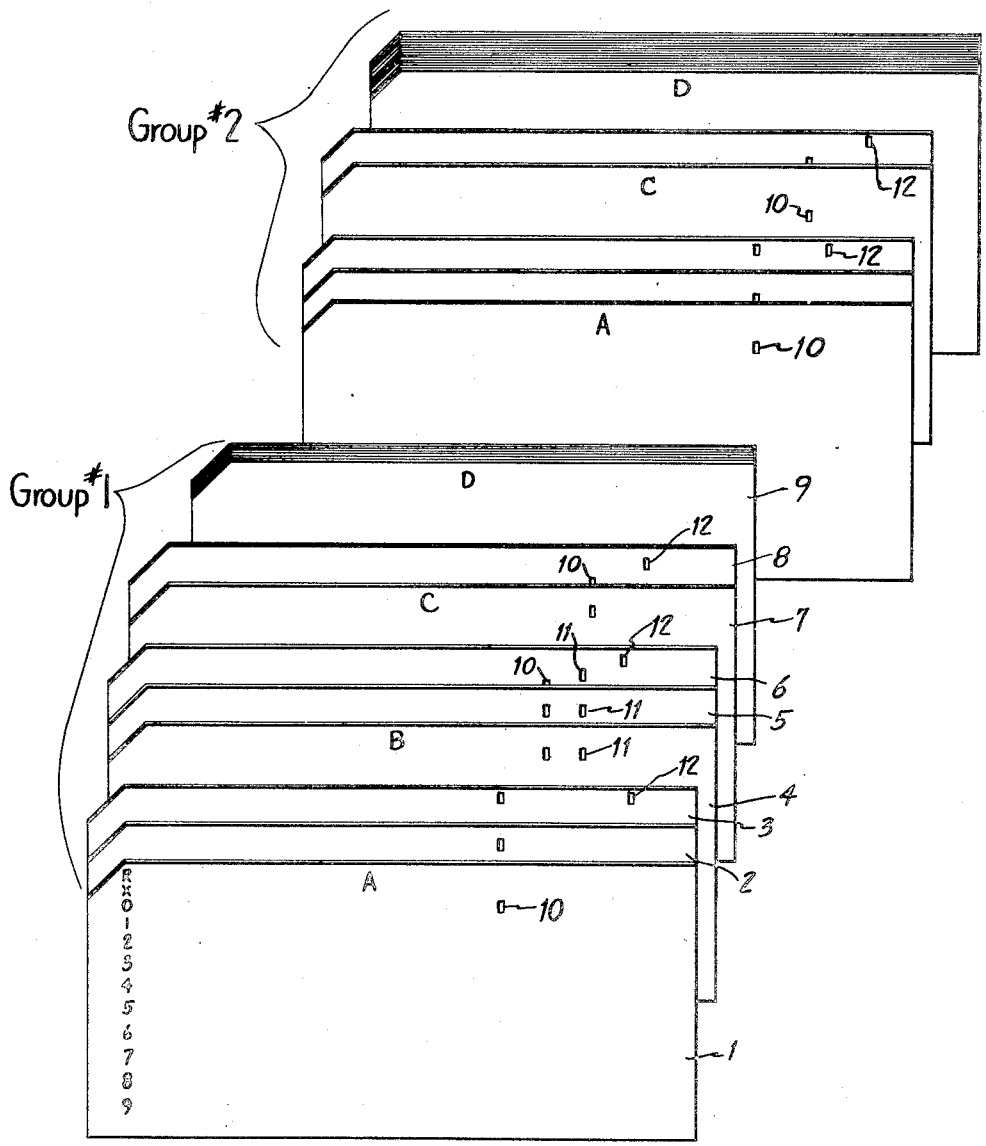
Fig. 1 shows a series of perforated record cards related to the first two groups of a series of accounts.

In the printing of bills on a continuous strip, control is exercised by a sequence of record cards arranged to print alphabetic heading data such as names, addresses, dates, in combination with other detail cards perforated to represent items and amounts to be recorded, accumulated, totalled and charged to the various customers. Such a sequence of cards is shown in Fig. 1 and the cards there represented are used to control the printing on two successive forms, such as those shown in Fig. 2. On the first form of the continuous record R shown in Fig. 2, it is seen that there are three sets of heading data A', B' and C' recorded above a number of detail or body lines D'. On the second form is an invoice to a different customer, which includes only the heading lines A2 and C2, but no heading lines corresponding to B' of the first form, because the goods are not to be shipped to a different address.

Referring back to the cards in Fig. 1 and reading them from the bottom to the top, it is noted that they coincide in number with the lines of recordings on the sheet in Fig. 2. Then it is also noted that all heading cards 1-8 are distinguished from the detail cards 9 by X punchings identified by the reference numeral 10. As a further distinction between the different sets of the heading data cards, other differently located X perforations 12 are punched in the last card of each of the heading sets A, B and C. It is also noted that the second or "B" heading set of cards of the first group is further identified by the X punchings 11 which are used to forestall skipping of the "B" space on the record strip R. There are no B-set cards in the second group and this is reflected in the blank space on the second form in Fig. 2. These set identifying perforations 11 and 12 are used to select the various carriage stopping and starting controls for determining the position of the record R and properly locating the first line of each series of heading impressions.

There is further record feeding control provided in the form of X detecting devices for sensing the change from cards having heading perforations 10 to those following detail cards 9 lacking such identification. Upon such a change of X to no X cards, the record form is advanced to the position in the body of form which is designated to receive the first item impression. Thereafter, when the detail records are controlling for recording, the record form is advanced in line spacing.

There is a further distinction between the various cards in a sequence related to more than one account. Group number perforations are used to distinguish between the cards relating to different customers. Therefore, upon the passage of the last detail card 9 and advancement of the first heading card of the incoming group #2, there is detected a change in the group numbers and the machine is controlled to take a total and record the total on a predetermined total line. After the total is printed, long feeding ejection is initiated and limited by the setting of the carriage lever to carry the record strip over into position to record the first heading line on the third form.

The record strip R (Fig. 2) is a continuous record divided into forms and preprinted with blocked-off areas for headings, shipping instructions, detail numbers, identifications and price columns. This is merely illustrative of the control for space skipping which is useful for many kinds of printed records.

The heading name and address cards 1-8 (Fig. 1) bear alphabet indicia in the form of code perforations. These perforations are sensed by the lower brushes of the tabulator and directed into print control magnets to control the recording of names and addresses.

The code arrangement of the perforations in the record card will first be explained. Referring to Fig. 3, the diagrammatic record card CA has the usual perforations for indicating numerical values as shown att he left side of the card. The alphabetical characters from A to I are combinations of one of the numerical characters from 9 to 1, plus a perforation in the R index point position. The characters J to R each comprise a perforation in one of the numerical positions 9 to 1, plus a perforation in the X index point position. The remaining letters of the alphabet, namely S to Z, each comprise a combination including one of the perforations 9 to 2, plus a perforation in the 0 index point position.

It may be mentioned that, as the address cards pass under the lower brushes and differentially timed impulses are initiated, these impulses are carried to control magnets and used to position alphabet print bars as about to be explained with reference to mechanism similar to that shown in Patent No. 2,111,122.

In Fig. 4 is shown an alphabet type bar T which is provided with a plurality of type elements upon which the digit and alphabet characters are arranged as indicated. For the purposes of explanation, the various characters are arranged and labeled in accordance with a particular zone. Thus, the digits are included in zone 1; the letters S to Z in zone 2; J to R in zone 3; and A to I in zone 4. Reference to Fig. 3 reveals that the letters I, R and Z each contain a perforation in the 9 index point position, but has a different zone perforation R, X and 0. Similarly, the letters H, Q and Y each contain the perforation 8 and a different zone perforation.

The type bar T is arranged to be moved to pass the printing position opposite platen P in synchronism with the movement of the card past the lower brushes and, as the 9 index point positions traverse the brushes, the Z type element will be approaching the printing positions; as the 8 index point positions traverse the brushes, the Y type element will be approaching the printing position, and so on.

Each type bar T is provided with a series of teeth 117 which are labeled 9 to 0 and which represent corresponding index point positions on the record card. As the type bar is moved upwardly the teeth 117 move to pass a stopping element 118. The element 118 is pivoted at 125 to a bell crank 126 which is normally held in the position shown by a bell crank latch 127 which has connection through a link 128 to the pivoted armature 129 of print control magnet PR.

Upon the energization of magnet PR in response to the sensing of a digit perforation, armature 129 will be rocked clockwise, drawing downwardly on link 128 to cause clockwise rocking of latch 127 to release bell crank 126 whose spring will thereupon shift the stopping element 118 toward the right into the path of the tooth 117 corresponding to the perforation whose sensing caused energization of the magnet. Further upward movement of the type bar is thus interrupted at this time. The stopping element 118 is held against upward movement by a bail 130 which later, as the zone holes are sensed, rocks counterclockwise to permit resumption of the upward movement of the type bar. During such movement, the element 118 may be stopped by a lever 131 which loosely straddles a rod and has its upper curved edge held down by a bar. The left end of the lever has an extension 132 resting upon a bail 133 which occupies a raised position during the analysis of the digit representing positions of the card. The member 131 is provided with three teeth which, under control of the bail 133, move downwardly to pass the toe of a stopping pawl 139 during the time that the zone perforations 0, X and R pass the brush LB. The pawl 139 is normally held with its toe out of the path of the teeth by a bell crank latch 140 which has a link connection 146 with the lower armature 147 of magnet PR.

Extending across the latches 140 is a ball 148 which occupies a raised position during the sensing of the digit positions, preventing tripping of these latches during this portion of the sensing operation. However, while the zone perforations are passing the brushes the ball 148 is rocked slightly counterclockwise so that an energization of magnet PR, due to the sensing of a zone perforation, will rock its armature 147 clockwise to elevate link 146 and rock bell crank 140 counterclockwise to release pawl 139 which will engage the first tooth 0 if the zone hole is at the zero position; the second tooth X, if it is in the X index position; or the third tooth R if it is an R hole. If no zone hole is present, the lever 131 will rock an additional step to cause an upper shoulder to engage the pawl 139. From the foregoing it is apparent that the alphabet printing bars can be stopped as governed by the address code perforations on the name and address cards, so that various words are spelled and recorded at the printing line.

The platen P has the usual pressure rollers cooperating therewith to hold and advance the record sheet R as the platen is rotated.

The foregoing portions of the description are concerned mainly with the controls of the regular printer. The following section deals with the strip feeding control unit.

A bracket 141 (Fig. 8) projecting from the carriage frame 134, forms a bearing for the shaft 142 of the carriage motor CM. A pinion 143 on the motor shaft 142 meshes with a gear 144 pivoted on a stud 145 on the side of bracket 141. Attached to gear 144 is a smaller gear 135 in mesh with a gear 136 keyed on the shaft 137. On the side of gear 136 (Fig. 5) is secured a gear 93 in mesh with an idler gear 94. The driving train of connections continues through gear 94 meshing with another idler gear 95 which in turn drives a gear 96 fastened to the line spacing drive shaft 151. The gear connections just traced form a constantly running train from motor shaft 142 to line spacing drive shaft 151. Other gearing, also outside the frame 134 with the line space drive, forms a selective two-speed drive for the ejection mechanism described hereinafter.

Continuing tracing the line spacing drive, reference to Fig. 5 shows that shaft 151 carries a clutch plate 152 attached thereto. Adjacent the toothed plate 152 is a cam 154 loosely pivoted on shaft 151. This cam carries a clutching pawl 155 pivoted at 156. A compression spring 158 mounted in a stud on cam 154 tends to engage pawl 155 with clutch plate 152, but an extending tail on the pawl is normally obstructed by the end of an armature lever 160 connected to the armature 161 of a line spacing control magnet LSM. The lever 160 is pivoted on a stud 162 and is urged in a counterclockwise direction against stop pin 163 by a spring 164.

When the line spacing magnet LSM is energized, the armature lever 160 is rocked in a clockwise direction, releasing the clutch pawl 155 which then engages the clutch plate 152, thus connecting the cam 154 to the driving shaft 151. As the cam 154 rotates it operates a lever 168 through a roller 169 on the lever in cooperation with the periphery of the cam. The lever 168 is pivoted on a stud 170 and is provided with an extending arm which is cut to form three notches. A link 172, placed adjacent the lever 168, carries a pin 173 adapted to cooperate with any one of the three notches in lever 168. The other end of link 172 is pivotally connected at 174 to a line spacing plate 175 loosely mounted on the platen feed and line space shaft 176. The plate 175 carries a feed pawl 177 pivoted at 178 on the plate and adapted to cooperate with a ratchet gear 179 fixed to shaft 176. This shaft is secured to a gear 107 (Fig. 6) and is thereby adapted to turn the platen P through gear 108 and gear 109 fastened to the platen shaft 69.

From the connections mentioned it may be noted that as the cam 154 (Fig. 5) is rotated the lever 168 is rocked in a clockwise direction, pushing link 172 down and rocking the plate 175 so that pawl 177 advances the platen feed shaft 176 one or more steps in a counterclockwise direction. The amount of motion imparted to the platen feed shaft is determined by the adjustment of the end of link 172 so that pin 173 cooperates with any one of the three notches in lever 168. If the pin cooperates with the notch nearest the pivot of the lever, the motion imparted will amount to one line space. When the link is lifted to cooperate with the center notch the motion carried to the platen amounts to two line spaces. Swinging the link to the right and the highest position, causes cooperation with the end notch in lever 168 and connects the line spacing devices to produce three steps of feed.

The manual adjustment of link 172 is brought about by means of a manipulated arm 183 extending inside the carriage frame 134. The arm is connected to an outside knob with a plunger which the operator may set to hold the arm in any one of three positions identified on the side of the frame. A shaft 182 is connected to the outside knob and has secured thereon arm 183 with a tab 184 cooperating with the side of link 172. By means of these connections the link 172 is swung to a space selecting position by arm 183. A spring 186 urges the lever 168 in a counterclockwise direction and tends to hold roller 169 against cam 154. Link 172 is held in constant cooperation with tab 184 by means of a spring 64.

A spring 187 wound around stud 178 tends to move pawl 177 into cooperation with ratchet 179. However, in the normal position of the parts, a cam face on the lower portion of pawl 177 cooperates with a stud 188 projecting from the frame 134 in such manner that the pawl is forced away from the ratchet. The same stud 188 serves as a stop for the plate 175 when it is drawn to the home position by a spring 189.

Secured to the side of ratchet 179 is a star wheel 190 provided for the purpose of normally preventing backward movement of the platen drive shaft 176. Cooperating with the star wheel 190 is a pawl 191 loosely pivoted on shaft 192 and held into cooperation with the star wheel by spring 193.

In addition to the described line spacing connections to the platen drive shaft 176, other devices are provided to long feed or eject the record paper R for wide spacing. Many of the gears previously mentioned, namely: gears 144, 135, 136, 93, 94, 95, and 96 (Figs. 5 and 8) are used in ejecting as well as in line spacing. Attached to gear 96 (Fig. 5) is a gear 65 meshing with a gear 66 keyed to a shaft 67. This shaft 67 is similar to the other shaft 137 (Fig. 8) in that it may be moved axially to place a pinion 87 thereon in and out of mesh with an eject drive gear 68. The other shaft 137 terminates in a similar pinion 88. Shaft 137 operates at a higher rate of speed than shaft 67, because the former is geared almost directly to drive pinion 143 while the latter is driven through a train of gearing involving two speed reductions between gears 93, 94, and 65, 66. The machine operator may choose the speed of record ejection according to the distance or space to be ejected. For spaces less than 3½ inches it is advisable to use the high speed train of ejection gearing, while for all longer lengths the low speed train should be used. A detailed showing of the change speed gearing is disclosed in Carroll Patent No. 2,189,025.

The ejection driving connections continue through a clutch which may be connected at any time in the operation of the machine to cause a form ejection operation. The driving member of the clutch is the gear 68 driven by either of the pinions 87 or 88, previously mentioned. Referring to Fig. 8 it is noted that gear 68 is pivoted on stud 171 in frame 134 and carries attached thereto a toothed clutch plate 197. Loosely pivoted on the same stud 171 is an ejection cam plate 200. Pivoted on the side of cam 200 is a pawl 198 on stud 199. The pawl is in alignment with clutch plate 197 but is normally held out of engagement therefrom by an armature lever 201 abutting against an extending tail on the pawl. The lever is pivoted at 202 and attached to an armature block 203 associated with an ejection control magnet EM.

When the magnet EM is energized lever 201 is rocked in a clockwise direction, releasing pawl 198 and clutching cam plate 200 to the driving gear 68.

Figure 6:
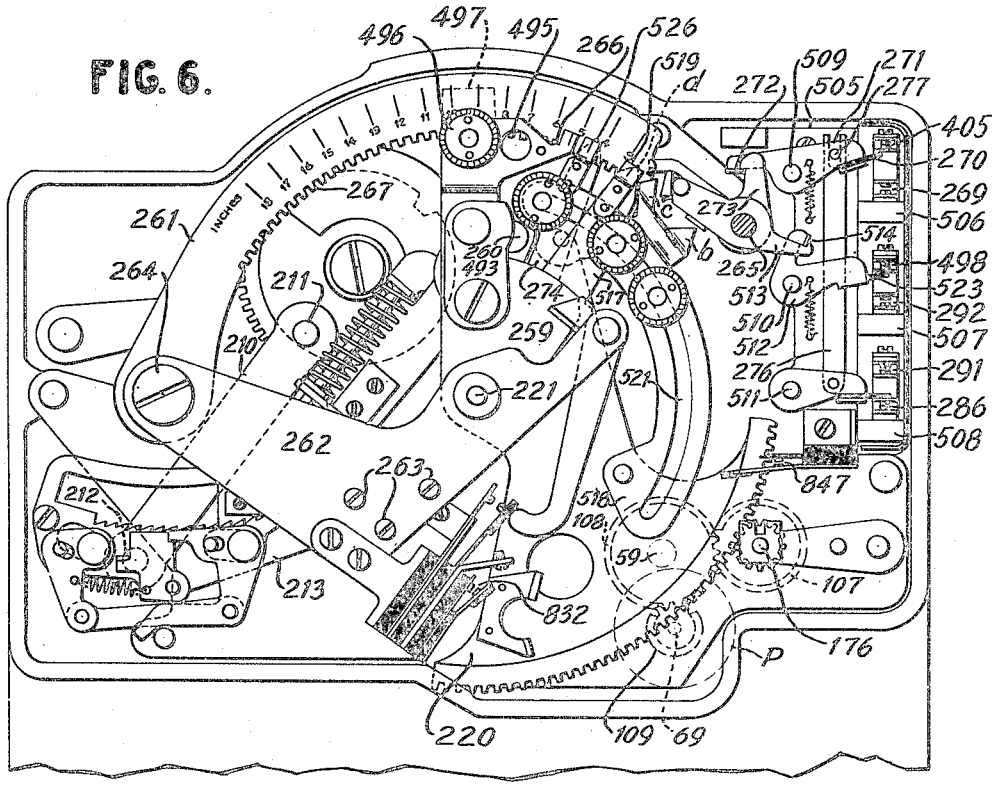
Fig. 6 is an elevation view of the mechanism settable to predetermine the spacing of items and the overflow line of the record forms.

Before describing the other connections for performing an ejecting operation, it is believed well to mention that such an operation may take place at any point during printing down the length of a record strip. Ejection is initiated by energization of magnet EM to feed the strip from form to form after line spacing operation has brought about an overflow condition, or when a group change and total printing operation calls for another blank form. In Fig. 6, the ejecting devices are shown in the normal position. There it is noted that a link 210 is articulated at 211 on side of plate 200 and at the other end it is pivotally connected at 212 to side of an ejecting frame 213 (Fig. 8) pivoted at 209 on the frame of the control unit. This rocking eject frame 213 is formed in the shape of an arc and carries a similarly shaped plate 247 with a series of teeth 214 cut in the inner side of the arc. Cooperating with these teeth is a block 215 formed with a single tooth 216 adapted to ratchet over the teeth 214 and engage any one of the teeth as a link 217 carrying the block 215 is drawn along the inner surface of the arc during line spacing operation. The block 215 is loosely pivoted on link 217 by means of a stud 218 mounted on link 217. An arcuate guide strip 219, secured to plate 247, cooperates with a groove in the top of block 215 and serves to hold the block in alignment with teeth 214. When the clutch connection comprising pawl 198 and clutch plate 197 is made effective by the energization of the magnet EM the plate 200 is connected to turn in a clockwise direction and thus moves link 210 (Fig. 6) and frame 213 on to the right with a gradually accelerated motion until the plate 200 has moved through an angle of ninety degrees and then the motion is retarded until the link is practically at rest as the plate reaches a midway position after the initial 180 degrees of motion.

Then the same type of motion is repeated as the plate goes through the final 180 degrees in arriving back to the home position after a complete revolution.

Continuing now with outlining the connections of link 210 to the line spacing devices for the purpose of ejection, it is noted that in the motion to the right the link carries along the ejecting frame 213 by rocking it in a clockwise direction about the pivot 209 (Fig. 8). As this is done, the teeth 214 on the eject plate 247 engage the block 215 on the end of link 217 and move this link to the right. The right end of link 217 is connected by a stud 246 to a sector 220 loosely pivoted on a shaft 221. The sector teeth are in mesh with a pinion 222 which is clutched to the line spacing shaft 176, which, as noted hereinbefore, serves to space the platen through the connections to gear 107 (Fig. 6).

As sector 220 is rocked step-by-step clockwise to the right in line spacing the tooth 216 (Fig. 8) ratchets idly over tooth after tooth along the line of teeth 214, while member 213 and plate 247 are in a horizontal position. The sector is stepped along in unison with the spacing of the strip because shaft 176 and pinion 222 are operated for each spacing cycle. Then, at any selected point in the operation, and when tooth 216 is in mesh with any of the teeth 214, ejection is performed by rocking member 213, pushing link 217 connected thereto through tooth 216 and block 215, rocking sector 220, turning gears 222, 107, (Fig. 6) 108, 109, shaft 69 and the platen P.

The return stroke of sector 220 may be adjustably varied to determine the length of form to be printed in the machine.

The form may be shortened by stopping the sector 220 at any point along its travel counterclockwise towards the left (Fig. 6). For this purpose, a lever 259, pivoted on shaft 221 carries a stopping block 493 cooperating with a stud 260 mounted on the side of sector 220. The upper end of the form length setting lever 259 is adapted to be adjusted around and held in any position along an arc formed by a segmental index plate 261. This index plate is secured at 264 to a frame plate 262 which is held to casting 134 by screws 263, and at the other end the index plate encircles shaft 265. The surface of the index plate is inscribed with long lines representing inches of spacing, and short lines (not shown) representing lines of print spacing. A pointer 266 is formed on the end of lever 259 opposite a gripping plate 497 to indicate the length of sheet selected. The bottom edge of plate 261 is formed with rack teeth 267 which are engaged by a key in the shape of a pinion that is inserted in aperture 495 and turned to move lever 259 and sector 220 to a selected position against the pressure of spring 242 (Fig. 8).

When the selected position is reached, the lever may be locked in place by turning a nut 496 (Fig. 6) on a screw passing through the gripping plate. Corrugations on plate 261 and lever 259 lock the lever in place when plate 497 is drawn towards lever 259 to pinch index plate 261 therebetween. As shown in Fig. 6 the lever 259 and sector 220 are positioned to handle forms five and one-third inches in length.

A series of contacts are employed to control the ejection and line space magnets and the tabulating start and stop devices. These contacts are supported on the inside of the casing 134. In Figs. 6 and 8 it is seen that a channel bar 505 supports three blocks 506, 507 and 508 each holding a pair of contacts. The channel is secured to casting 134 and formed to hold stud 509 and shafts 510 and 511 supporting the operating members for the contacts.

The machine is provided with devices for skipping a variable amount of space between the last address line of a heading and the next heading or the number printing line for the first item. It is described hereinafter how the line spacing magnet LSM is energized to start the skipping operation. After feeding a selected length of strip, space skipping is stopped by opening contacts 498 (Fig. 6) with devices about to be described.

The skip stop contact 498 is held closed by a bell crank 512 fastened to shaft 510. The crank in turn is held by a latch 513 pivoted on shaft 265 and formed with a shoulder engaging a lug 514 on the crank. At the end of the latch is pivoted a flipper 515 (Fig. 7) on a stud 516. The latch is operated by an adjustable tripping lever 517 fastened to an arcuate slotted plate 518 (Fig. 6) secured to the sector 220. The upper end of the lever 517 (Fig. 7) is formed with a pointed cam face d which, together with auxiliary cam points b and c, cooperate with flipper 515 to rock the latch and release the bell crank 512. Because the mounting of flipper 515 is flexible, the latch 513 is tripped and crank 512 moves back ready to relatch even though lever 517 remains directly beneath flipper 515. A pointer 519 on the lever 517 may be set to the proper point along scale 261 so that the first item line D' may be printed at any selected line of the forms on the strip. A screw and nut connection extending through lever 517 and a slot 521 in plate 518 may be moved along the slot and fastened in the desired position.

When bell crank 512 is released, a spring urges it in a clockwise direction to lower an insulation finger 523 away from contacts 498 and down against contacts 292. Thus contacts 498 are opened and contacts 292 are closed for purposes described more fully hereinafter. The shaft 510 is attached to bell crank 512 so that it also turns to place an arm 524 (Fig. 5) thereon in the path of a roller 525 on the line space operating arm 168. The roller serves to restore the bell crank to the latched position shown in Fig. 6. During space skipping, roller 525 is lowered upon each spacing operation. When unlatched, arm 524 swings clockwise momentarily to rock crank 512 and open contacts 498, but the arm is rocked back counterclockwise by the roller 525 rising to the normal position at the end of the last space skipping operation.

As explained hereinbefore, the ejecting operation is controlled by the energization of magnet EM. This magnet is energized at various times according to the setting of the controls and the closing of contacts to form a completed circuit. For one form of control, the contacts 269 (Fig. 6) are closed as the printing on the record approaches the end of a form. These contacts 269 are operated by an insulation finger 270 fastened to one end of a lever 271 pivoted on stud 509. The other end of the lever is formed with a lug 272 engaged by a latch 273 pivoted on shaft 265 alongside latch 513. Latch 273 is operated at a selected point in the feeding of a record form, by a cam face on the upper end of a lever 274 loosely pivoted on shaft 221 and held in place by a nut and screw projecting through slot 521. A pointer 526 on the lever indicates the inches of space through which the record form is linespaced before contact operation takes place. The present setting is at four and one-half inches, equivalent to twenty-seven line spaces.

When lever 271 is in the normal position insulation finger 270 holds contacts 405 closed for reasons set forth hereinafter. However, when lever 274 strikes latch 273, lever 271 is unlatched and free to rock in a clockwise direction as urged by a spring. Thus finger 270 is lowered to open contacts 405 and close contacts 269 which are in series with the eject magnet EM and adapted to initiate an eject cycle of operation.

The lever 271 is restored by a link 276 connected thereto by a pin and slot formation 277. Individual coil springs restore latches 273 and 513.

When an eject operation takes place, various electrical and mechanical devices in the machine must be operated to control carriage feeding, the operation of the carriage motor, the disablement of the line space latch, and the operation of the tabulating machine. Contacts are operated to cause a delay in the restarting of the tabulating driving connections during an eject operation. Other disengagements must be effected to free the line spacing shaft from ratchet connections during ejection. These and other controls are effected by the cam faces formed on the periphery of plate 200 (Fig. 8) which, as noted in a foregoing section of the description, turns through a complete clockwise revolution during an ejecting operation.

Cooperating with the cam plate 200 is a contact operating lever 279 pivoted at 280 on a fixed plate 138 and drawn by a spring 281 into contact with the periphery of the cam plate. The upper end of the lever 279 is formed with a projection 282 which acts as a cam face and also as a latch in cooperating with a notch 283 cut in the periphery of plate 200. Early in each eject cycle, the side of notch 283 acts as a cam face to rock lever 279 in a clockwise direction, moving down an arm 284 connected thereto by pin and slot connection 285. The arm is fastened to one end of shaft 511, the other end of which carries a member 287 with an insulation finger 288 for opening and closing contacts 286 and 291.

The initial movement of cam lever 279 serves to open contacts 286, but contacts 291 are closed later in the operation when a projection 289 on cam plate 200 strikes the end 282 of the lever, rocking it further in a clockwise direction and lifting finger 288 against contacts 291. This final lifting movement serves also to restore lever 271 (Fig. 6) which is rocked counterclockwise by link 276 attached to member 287 by stud 290.

The machine is provided with a series of contact operating pointers settably mounted in the automatic carriage unit to determine the skip stopping positions for a plurality of heading print spaces. Referring to Fig. 6, it is seen that the ordinary pointer arms 517, 274 and 266 mentioned hereinbefore, are set to select the spacing of 2½ inches, 4½ inches and 5⅓ inches, respectively. As already explained, in the ordinary use of the automatic carriage, lever 517 determines the position in which line space skipping is terminated and item printing is initiated, and then after a series of printing and line spacing operations, the other lever 274 comes into action to determine the length of the printing area desired, after which ejection is to be initiated to the first heading line determined by the setting of pointer 266.

For the purposes of the present invention, an auxiliary stopping means or cam plate 500 (Fig.

7) is secured to lever 517; and the plate is formed with two cam points $b$ and $c$ in the same plane and proportions as the cam point $d$ formed directly on the lever. These cam points $b$ and $c$ operate the same as point $d$ in striking the flipper 515 from the left and rocking the latch 513 to release crank 512 (Fig. 6), to open contacts 498 and terminate the space skipping operation. In the control of form feeding, cam points $b$ and $c$ are effective before the usual stopping action by point $d$. The relationship is shown by the sample form, Fig. 2, whereon point $b$ determines the first line position of heading B', and point $c$ determines the first line position of heading C', and point $d$ determines the first detail or body line D'. Of course, the first line of the first heading A' is arrived at by ejection as distinguished from line spacing and is determined by the setting of pointer 266 (Fig. 6).

Figure 7:
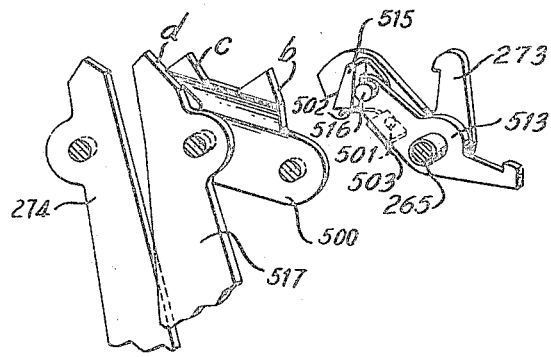
Fig. 7 is a detail perspective view of the heading space tripping cam devices for controlling the spacing of the headings on the record forms.

The end flipper 515 (Fig. 7) of crank 513 is made flexible so that the crank may rock freely and reengage the contact trip member 512 (Fig. 6), even though any of the contact points $b$, $c$ or $d$ may be positioned directly under the point 515. The end 515 is shaped as shown in Fig. 7 and pivoted on stud 516 located near the end of crank 513. Also attached to the crank is a thin leaf spring 502 bent so it may be riveted at 501 on the side of the crank as positioned by an offset shoulder 503. Spring 502 normally urges the flipper 515 in a clockwise direction to hold it in a position where the levers are required to rock the point down before they are effective to rock the crank. After any of the cam points pass the end of the flexible point 515 the spring 502 becomes effective to swing it up and around in a position away from the operating levers so that crank 513 can rock counterclockwise into the latching position.

As shown in the wiring diagram (Figs. 9a-9i), the controls of the automatic record feeding devices are coordinated with the controls of an alphabet printing tabulator. The tabulator is of the type disclosed in United States Patents Nos. 2,079,418 and 2,172,067 and 2,199,547, and application Serial No. 609,854, filed on August 9, 1945, to which reference may be made for details of construction. Before describing the manner in which an automatic carriage is influenced by the ordinary tabulator controls and operations, and vice versa, it is believed well to outline the usual tabulator operations.

In such machines a motor TM (Fig. 9a) is connected to communicate a drive through two clutches which are selectively operated for card feeding and printing operations. A number of CF cam contacts operate only when the card feed clutch is engaged. Certain PM contacts operate only when the printer clutch is engaged. Other CB contacts operate all the time that the motor is active. A series of TS contacts are operated only when a total taking cycle is initiated.

After record cards, such as those shown in Fig. 1 are placed in the feed magazine, an initial feeding cycle is brought about by pressing a start key to connect the card feed clutch devices. The cards are then advanced in succession with each one passing first under a set of upper brushes UB (Fig. 9i) and then one cycle later under another set of brushes, identified as lower brushes LB, before passing into a stacker.

As the card feeding starts, a cam contact CF9 (Fig. 9i) closes to call in a relay R1. The circuit passes through line 320, circuit breaker contacts CB1-4, the wire 328, timer contacts CF17, CF18, contacts R2a, common brush 329, the upper brush contact roller 330, brush 331, wire 332, cam contacts CF9, the pickup coil of relay R1, wire 333 and line 321. Relay R1 is then held through contacts R1a and CF9 until the first full cycle is well advanced.

Relay R1 is effective to open contacts and deenergize the connections to the card feed clutch. Thus the card feed mechanism is operated for one cycle and then stopped.

Under initial starting conditions it is necessary to depress the start key a second time to cause a continuous succession of card feed cycles. As soon as cards continue to feed and insulate the brush 331, relay R1 remains deenergized and certain of its contacts remain closed to maintain the holding circuit for the card feed clutch controls. Another relay R2 is connected with relay R1 to control contacts at various points in the machine in the nature of an upper card lever control.

The lower card lever relays R3 and R4 (Fig. 9i) are energized when the first card passes below the upper brushes UB and they remain energized until the last card passes the lower brushes LB. The first card closes the lower card lever contacts LCLC after digit analysis under the upper brushes. Then cam contacts CF6 also close to energize the relays by the circuit: line 320, wires 336 and 337, cam contacts CF6, card lever contacts LCLC, relays R3 and R4, wire 333, and line 321.

In listing operations the record card passes the lower brushes LB in synchronism with the upward movement of the type bars. Magnets PR (Fig. 9i) operate stop pawls to locate the type bars in positions corresponding to the data punched in the card and at a predetermined time, hammers are tripped to record the information on the record strip. Adjustment of the type bars is regulated by impulses carried to magnets PR from the lower brushes LB. An illustrative printing control circuit involves line 320, contact breakers CB1-4, wire 328, timer contacts CF17 and CF18, wire 346, lower card lever relay contacts R4a, common brush 345, contact roller 347, through the perforation in the card by a lower brush LB, the brush socket, plug wire 349 to socket A1, normally closed total contacts TSa, magnet PR and line 321.

Contacts TSa are shifted for total cycles so that printing is then controlled by impulses from an accumulator rather than from the lower brushes.

Many operations of the tabulator and record feeding devices are directed under the control of what are called X distributors. These distributors are switches that are operated under control of special digit or X perforations punched in cards for distributive control purposes. Contacts CF5 (Fig. 9i) are closed at the instant the X holes pass the card reading brushes. They set up a circuit for multi-contact relays as follows: line 320, cam contacts CF5, wire 351, contacts R1a closed as long as cards are feeding, multi-contact relays XR1—22 and line 321.

Figure 9A:
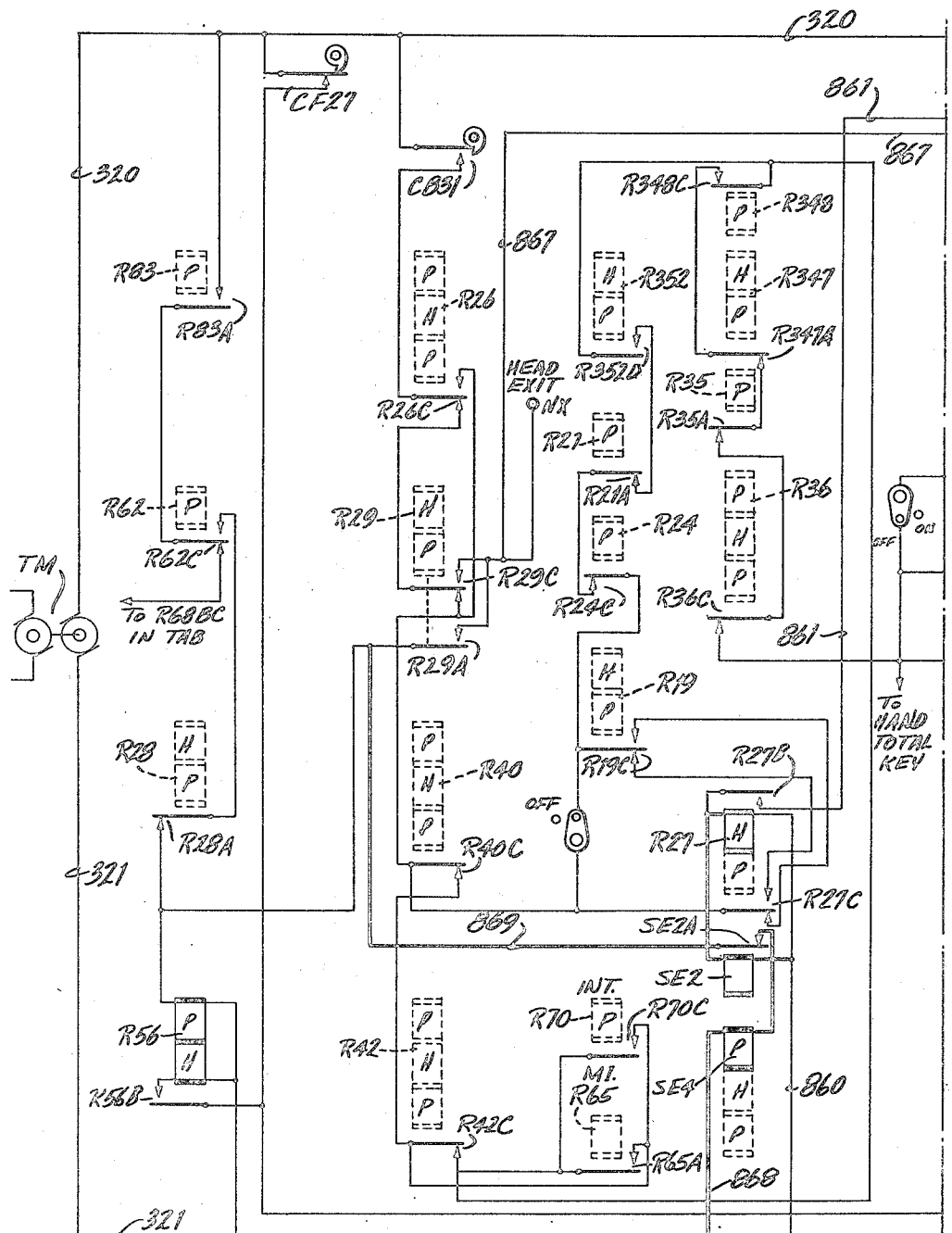
Figure 9B:
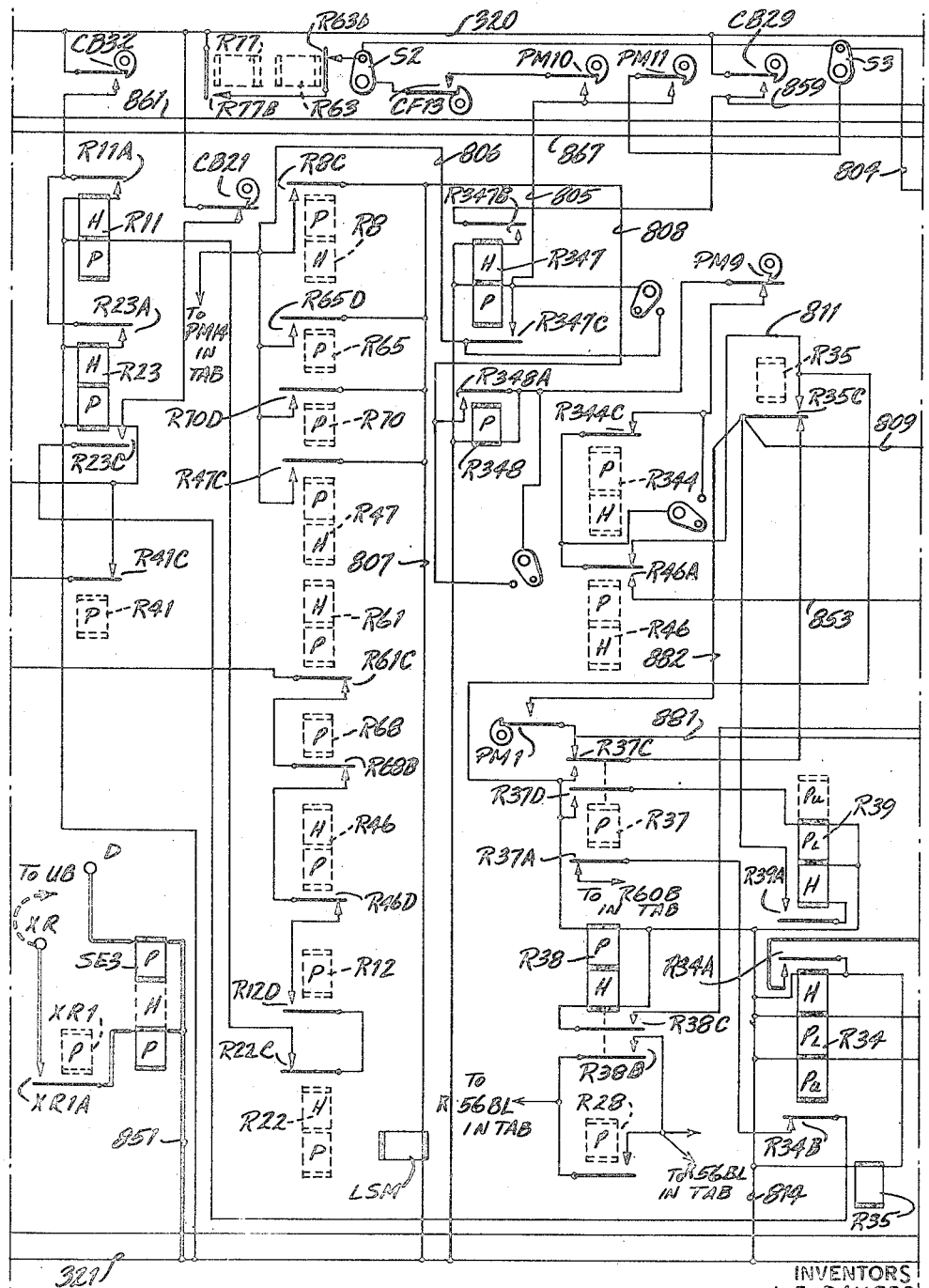
Figure 9C:
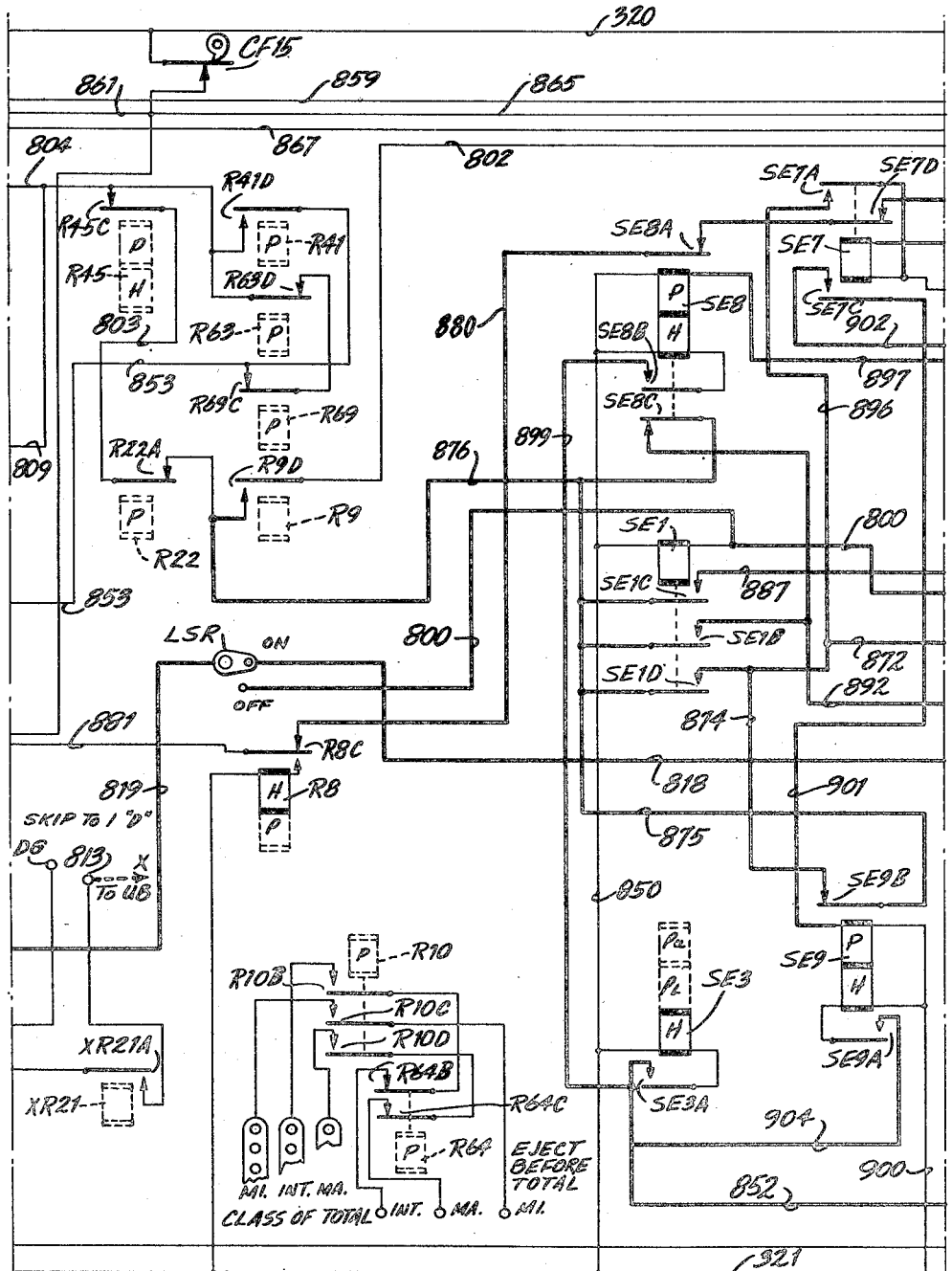

At the bottom of Figs. 9b and 9c it is seen that one of the relays, relay XR21, controls a contact XR21A in series with an X distributor pickup coil R34 which receives X impulses through a socket 813 connected to the upper brushes UB. A similar pickup coil PL for relay R34 is provided with a socket DG to receive digit impulses when a digit selector is used in connection with special holes sensed at the upper brushes, but this form of control is not used in connection with the cards illustrated in Fig. 1.

A sample circuit for sensing a special X perforation is as follows: line 320 (Fig. 9i), contacts CB1-4, wire 328, timing contacts CF17, CF18, upper card lever control contacts R2a, common brush 329, contact roller 330 and through the record card as sensed by an upper brush UB to detect an X perforation, a socket in line with the related upper brush, a plug wire to socket 813 (Fig. 9c), contacts XR21A, the first pickup coil of relay R34, wire 814 and line 321.

The action of a pickup coil is usually preparatory to the X distributor control which takes place a cycle later in the operation than the cycle in which the special perforation is sensed while the card is under the upper brushes. Therefore, there are times when another relay is picked up to become effective during the cycle when the card is passing the lower brushes, at which time it is desired to distribute the data sensed therefrom or alter the nature of the accounting operation.

For the purpose of calling a second X distributor relay into operation the first one closes contacts in series with the second. Also in series with this pickup coil are digit transfer contacts which are cam-operated to hold the pickup circuit between the time that the contacts CB29 open, which is overlapped by the time that cam contacts CF15 close.

Group control devices are provided for separately considering different classes or groups of cards as distinguished by different group number perforations for different groups. Consecutive cards are compared; one card being read at the upper brushes while the preceding card is read at the lower brushes. As long as the card readings are alike, the card feed continues to function. When the machine senses that the two group readings are not alike, the feed unit stops, the machine prints the total, the accumulator is cleared to zero, and the machine automatically starts feeding the cards of the next group.

Preliminary to the establishment of group control circuits, a number of preparatory relays R169—R172 (Fig. 9i) are energized to close the circuits for the comparison relays. The preparatory circuit includes line 320, cam contacts CF19, relays R169—R172, wire 386, wire 369 and line 320. As an example of the effect of these relays, it is seen that relay R169 serves to close contacts R169b in series with the group control pickup coils R129—R133.

The actual comparing circuits are connected by plug wiring between the pickup coils and certain upper and lower brushes devoted to sensing group numbers or special perforations. An example of the comparing circuits is as follows: line 320 (Fig. 9i), contacts CB1-CB4, wire 328, timer contacts CF17 and CF18, contacts R2a, common brush 329, contact roller 330, through the perforation in the card sensed by upper brush UB, plug wire 387 connected from a socket in line with the upper brush to a socket 388 in line with the pickup coil of relay R129, contacts R169b and wire 369 to line 321. As long as group numbers agree, a companion circuit to that already traced is set up at the same time through a pickup coil of relay R130 as energized through the lower brushes by the following circuit: line 320 (Fig. 9i), contacts CB1-CB4, wire 328, contacts CF17 and CF18, wire 346, relay contacts R4a, common brush 345, contact roller 347, through a perforation in the card sensed by the lower brush LB, a plug wire 389 connected to socket 390, pickup coil of relay R130, contacts R172b, wire 369 and line 321.

Relays R129 and R130 have holding coils and contacts in series therewith for sustaining the comparing circuit connections. The holding circuit includes line 320, cam contacts CF20, CF21, wire 391, contacts R129a, the holding coil of relay R129, wire 386, wire 369 and line 321. In a similar fashion the other pairs of holding coils, such as those of relays R133, R134, are picked up and held as a part of the comparing control.

Figure 9D:
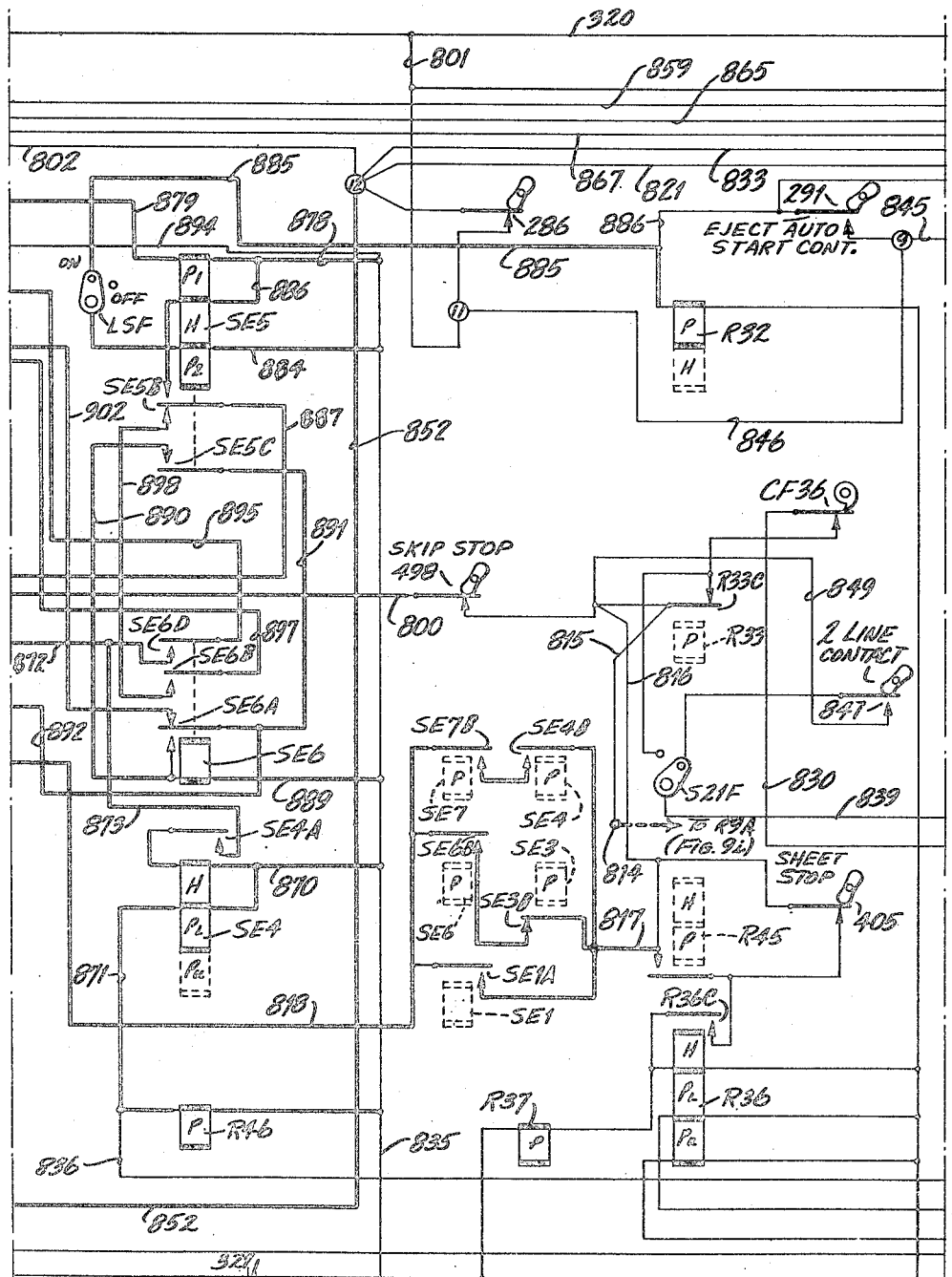
Figure 9E:
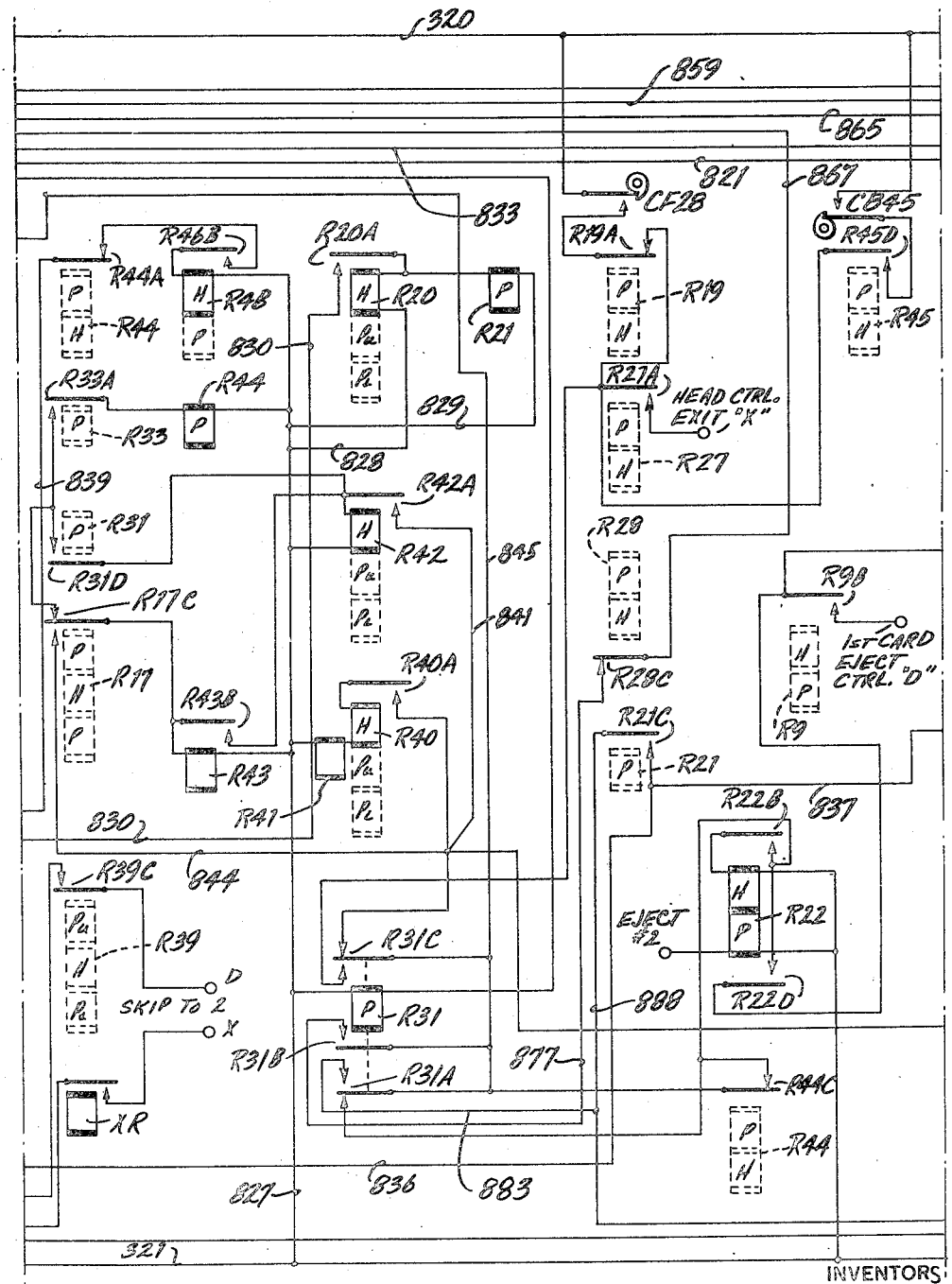
Figure 9F:
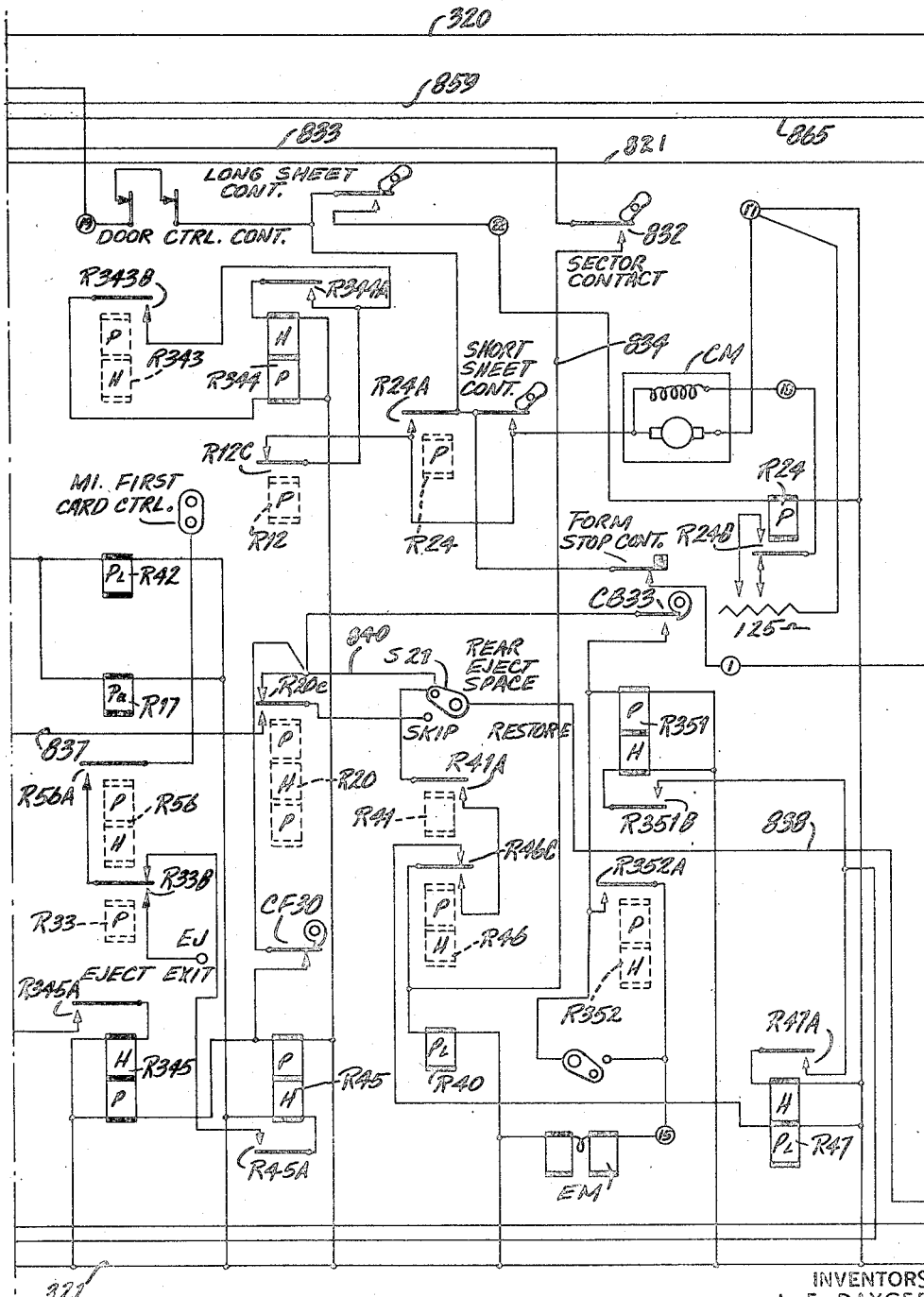
Figure 9G:
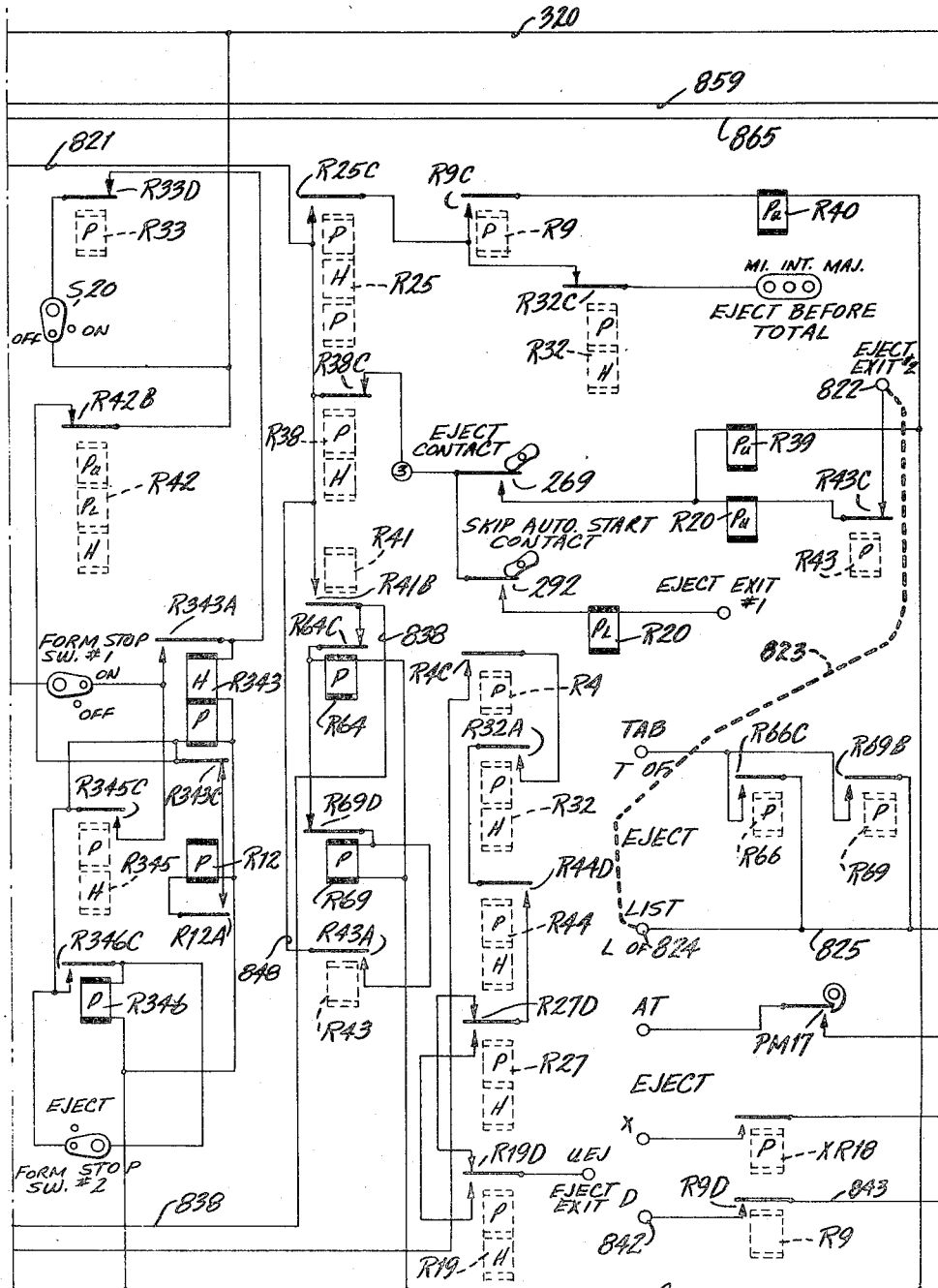
Figure 9H:
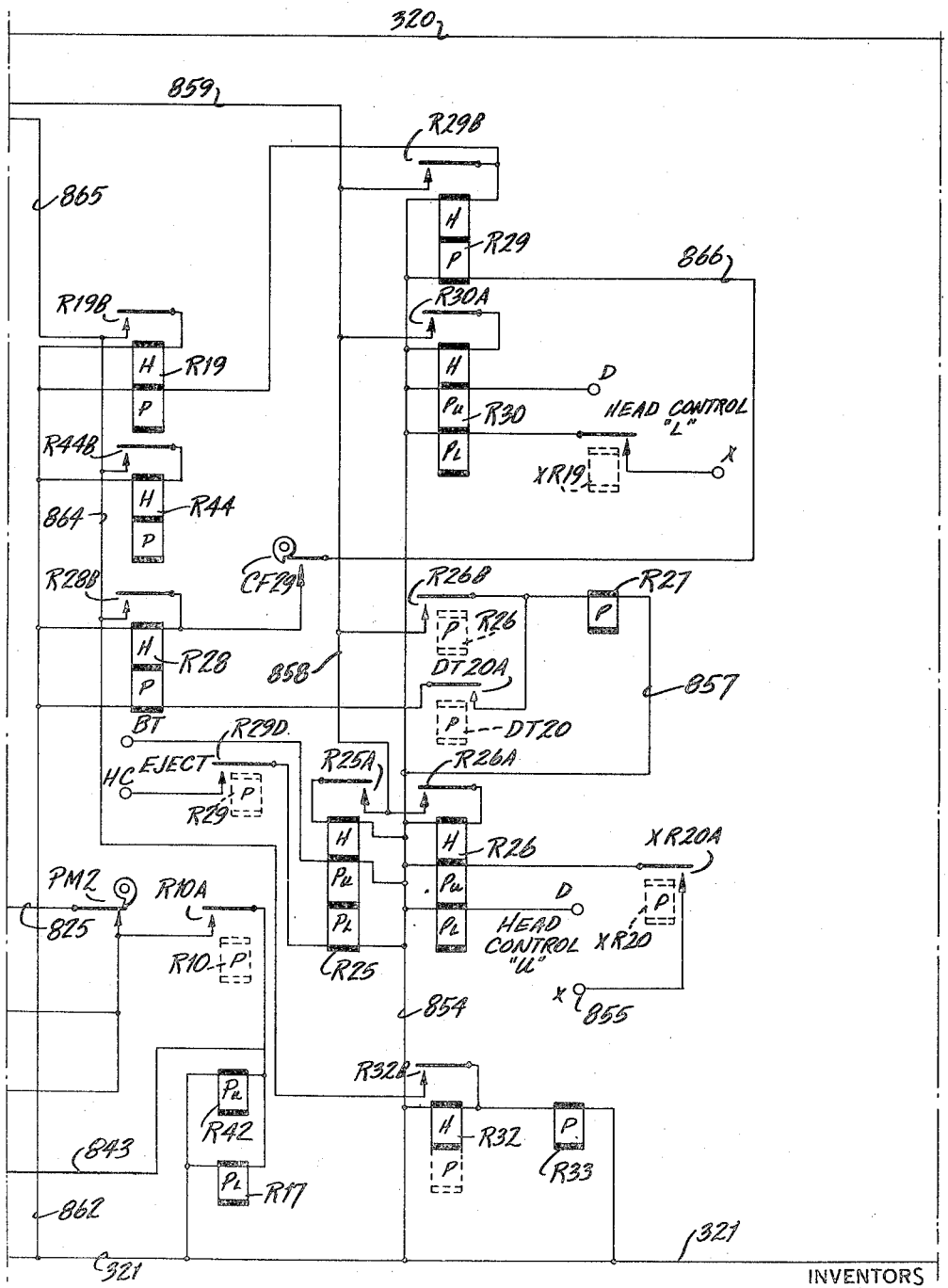
Figure 9I:
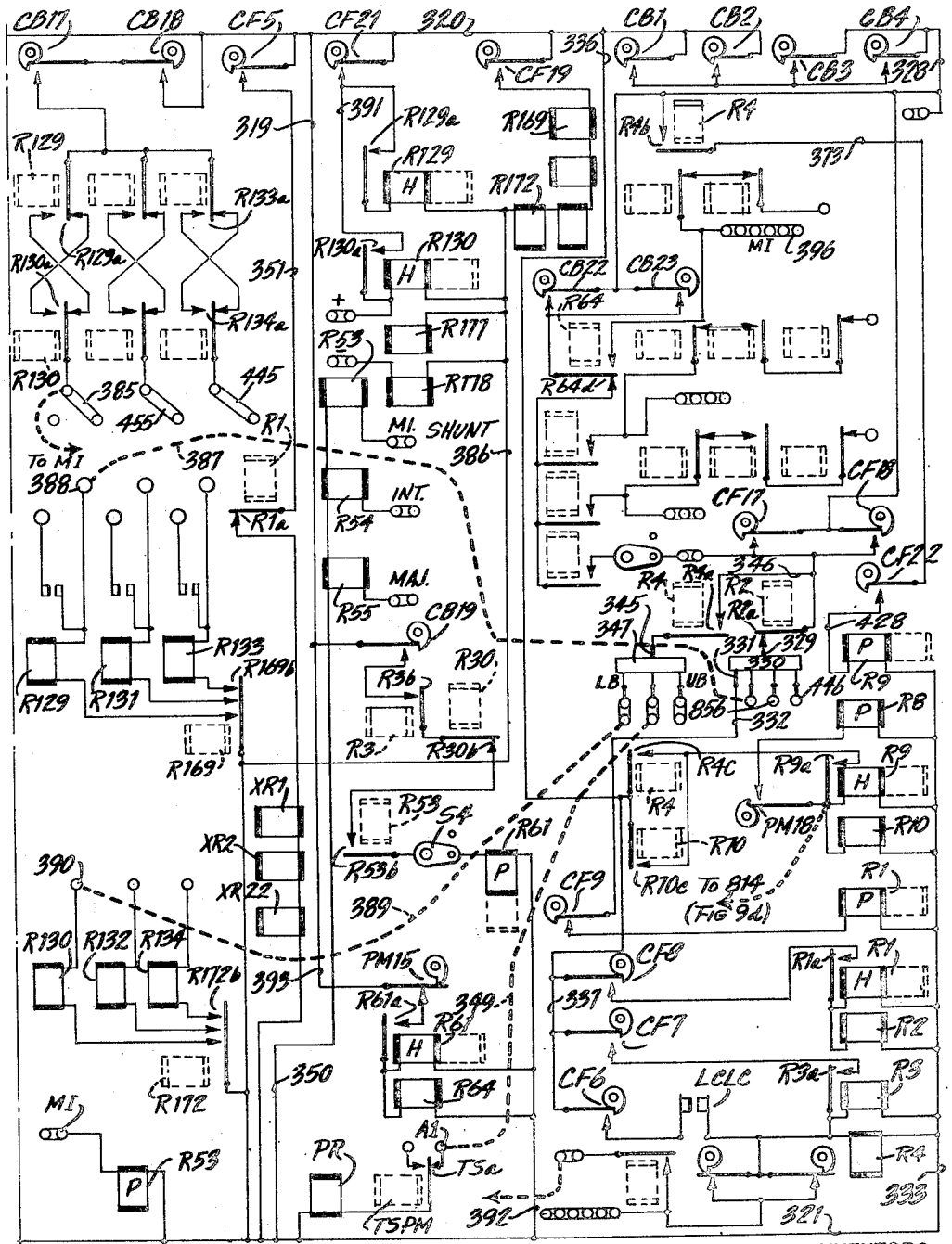

Referring to the upper left-hand corner of Fig. 9i, it is seen that the pairs of comparing relays are associated with pairs of contacts so arranged that, when a related pair, such as relays R129 and R130, are energized at the same time, they fail to provide a circuit path. However, should one or the other be energized alone, showing that there is a disagreement in the group control perforations, then a circuit is established for initiating group control operation. Assuming that there is a disagreement in the group numbers in the upper orders and that relay R129 is energized before relay R130, then the following circuit is established for setting up a minor control operation: line 320, cam contacts CB17, CB18, the left contacts R129a, the right contacts R130a, a plug wire connection between the orders and socket 385, plug wire to socket MI SHUNT, the pickup coil of relay R53, wire 350 and line 321. A holding circuit is established for relay R53 due to the closure of contact R53a in series with the holding coil. The holding coil of relay R53 operates other contacts R53b in series with a minor control pickup coil of a relay R61. The minor control circuit includes line 320, wire 319, cam contacts CB19, lower card lever relay contacts R3b, heading control suppression contacts R30b, relay contacts R53b, switch S4, the pickup coil of relay R61, wire 392 and line 321.

A holding circuit is established for relay R61 by the closure of contacts R61a and connections which may be traced from line 320, through wires 319 and 393, cam contacts PM15, contacts R61a, relay R61, wire 392 and line 321. Associated with relay R61 is another minor control relay R64 which is energized along with it. These relays have contacts throughout the machine for controlling the suspension of card feeding, the initiation of total taking, etc.

The foregoing description of the group control comparison and the resulting pickup of relays for control purposes is duplicated with respect to other columns or groups of columns on the record cards for intermediate and major control. The particular columns selected for control are made effective by plugging from various sockets, such as 385 to the sockets INT and MA. Then the intermediate relay R54 and major relay R55 are called into action to set up circuits for relays R67 and R73 similar to that of the minor control described in connection with energization of relay R61. Associated with intermediate relay R67 are two other control relays R69 and R70, and major holding relay R73 also has an associated relay R74.

The "1st Card In" control involves not only relay R10 but also relays R8, R9 and R47 as shown at the right in Fig. 9i. There it is seen that the pickup coil of relay R9 is energized by a circuit involving line 320, contacts CB1-4, wire 328, lower card lever relay contacts R4b, wire 373, cam contacts CF22, wire 428, relay R9, wire 333 and line 321. Contacts R9a are then closed to provide the holding circuit from line 320, through wire 336, relay contacts R4c or intermediate control contacts R70c, contacts R9a, relay R9, wire 333 and line 321. Relays R10 and R47 are connected in parallel with relay R9 to be energized along therewith as soon as a card is under the lower brushes.

The circuit arrangements mentioned hereinbefore deal mainly with the control of the tabulator, while those about to follow are concerned more with controls reaching into the automatic carriage to operate magnet LSM for line spacing and skipping, and magnet EM for long feeding or form to form ejection.

It will be realized that the circuits about to be traced for line spacing and ejection control are not all the circuits possible to exercise control thereover. These circuits given are pertinent to the present invention and all that are necessary for an understanding, which should not be burdened with extraneous matters.

The line spacing control for ordinary listing operation provides a circuit through magnet LSM when printer cam contacts PM11 close after each printer operation. The circuit for list spacing includes line 320 (Fig. 9d), wire 801, post 11, carriage contacts 286 opened only on ejection operation, post 12, wire 802 (Fig. 9c), relay contacts R9D closed after first card is past upper brushes, relay contacts R22A opened only on ejection control, relay contacts R45C also opened only as an ejection interlock, wire 804, (Fig. 9b), switch S3 closed for listing, printer cam contacts PM11, wire 805, relay contacts R347C for space interlock control, wire 806, relay contacts R8C closed after first card is in, wire 807, and magnet LSM connected to line 321.

When the line spacing control is used for space skipping, i. e., to advance record R from one heading space to the next, or from the last heading to the first item line, then another circuit is established for space magnet LSM depending on relays R34 and R35 and holding circuits therefor to shift contacts R35c for establishing the following circuit: line 320 (Fig. 9d), wire 801, post 11, carriage contacts 286 closed until ejection, post 12, wire 802 (Fig. 9c), "first card in" relay contacts R9D, interlock relay contacts R22A, wire 803, ejection control relay contacts R45C, wire 809 (Fig. 9b), skip control relay contacts R35c closed on detection of x hole in a heading card, wire 811, sheet overflow relay contacts R46A, control relay contacts R344C opened only by strip end, printer cam contacts PM9, control relay contacts R348A of space control interlock, wires 808 and 807, magnet LSM and line 321. Then magnet LSM continues to be energized and space skipping continues until the holding circuit for relay R35 is broken by a new control relay SE—1 which is in turn controlled by the contacts 498 (Fig. 6) opened by cam points b, c, and d (Fig. 7).

Before explaining how relay R35 is deenergized, it is well to note first how it is called into operation upon the detection of an "end of heading" x hole 12 (Fig. 1) in the last heading card of a set. When such a card passes under the upper brushes UB (Fig. 9i) a "skip initiation" circuit is established as follows: from line 320, through circuit breakers CB1-4, wire 328, cam contacts CF17 and CF18, card lever relay contacts R2A, common brush 329, contact roller 330, then through a special x perforation 12 in a last heading card by an upper brush UB, socket 446 and a plug wire to socket 813 (Fig. 9c), x control relay contacts XR21A, the pickup coil of relay R34, and wire 814 to line 321. A holding circuit for relay R34 and a companion coil R35 is then established as follows by the closure of contacts R34A. Line 320 (Fig. 9i), wire 336, lower card lever relay contacts R4c, "first card in" relay contacts R9a, a wire from these contacts to post 814 (Fig. 9d), wires 815, 816 and 817, relay contacts SE1A closed except when contacts 498 are cam opened to deenergize relay SE1 as noted hereinafter, wire 818 (Fig. 9c), line selection switch LSR, wire 819, contacts R34A, the holding coil of relay R34 and relay R35 in parallel, wire 814 and line 321. Because relay R35 is held with R34, its contacts R35c (Fig. 9b) will hold closed for continued skipping as long as contacts SE1A (Fig. 9d) remain closed. Although contacts SE1A are controlled to open at the end of the A and B headings by the cam points b and c (Fig. 7), missing heading cards cause the establishment of one or two shunts through SE3B (Fig. 9d), or SE4B around SE1A as explained at greater length hereinafter.

The operation of the eject mechanism of Fig. 8 for long feeding upon the energization of magnet EM is explained hereinbefore. Now it is pertinent to note that upon an overflow condition or a group change the magnet is energized to feed the record R from form to form.

When an overflow is detected, lever 274 (Fig. 6) closes contacts 269 and then relays R20, R21, R40, R41 and R46 are picked up to prepare a circuit for eject magnet EM. The initiating circuit includes line 320 (Fig. 9d), wire 801, post 11, eject interlock contacts 286, post 12, wire 821 (Fig. 9g), interlock relay contacts R38C, post 3, overflow eject contacts 269 closed by lever 274 near the end of a form, the pickup coil of relay R20, normally closed relay contacts R43C, plug socket 822, plug wire 823 connected to socket 824 for listing control, wire 825, cam contacts PM2, "first card in" relay contacts R10A, relays R42 and R17 and line 321.

A holding circuit for relay R20 and a companion coil R21 is set up as follows: line 321 (Fig. 9e), wire 827, wires 828 and 829, relay coils R20 and R21, contacts R20A, wire 830 (Fig. 9d), cam contacts CF36, interlock relay contacts R33C, wire 815, post 814, wire to R9a (Fig. 9i), "first card in" relays R9, R10, and R47, and wire 333 to line 321.

Relay R42 is then held by a circuit through line 321 (Fig. 9e) wire 827, holding coil R42, contacts R42A, wire 841, relay contacts R31C, wire 845 (Fig. 9d), post 9, wire 846, post 11, and wire 801 to line 320.

A relay R43 is picked up by the closure of the contacts of relay R17 as follows: line 321 (Fig. 9e), wire 827, relay R43, lower relay contacts R17C, now closed, wire 844, relay contacts R31C, and wires 845, 846 (Fig. 9d), and 801 to line 320.

Assuming that switch S21 (Fig. 9f) is set for "Eject Space" control, as distinguished from "Skip Restore" control which is for shorter advances of the record, then the eject circuit is established as follows: line 320 (Fig. 9d), wire 891, post 11, interlock contacts 286, post 12, wire 821 (Fig. 9g), wire 848, relay contacts R43A, normally closed intermediate total relay contacts R89D, normally closed minor total relay contacts R64D, wire 838 (Fig. 9f), switch S21, wire 840, cam contacts CB33, relay contacts R352A as an interlock for ejection at low speed, eject magnet EM and line 321. The eject cycle causes a long feeding operation from the overflow line of one form to the first heading line of the next form.

At the end of ejection, line space skipping is initiated for what is ordinarily two spaces, but in the present instance is for spacing over all second form heading spaces to the first detail line D'. The "two line" contacts 847 (Fig. 6) are closed and the relay R46 is held as follows: line 321 (Fig. 9i), wire 827, holding coil R46, contacts R46B, relay contacts R44, wire 839 (Fig. 9d), switch S21F, "two line" contacts 847, wire 849, wire 815, post 814, and a wire to contacts R9a (Fig. 9i), relays R9, R10, and wire 333 to line 321.

Relay R46 was picked up previously by a circuit including line 320 (Fig. 9a), cam contacts CB31, heading control contacts R26C and upper contacts R29C, wire 867 (Fig. 9e), relay contacts R28C closed when no heading card is at upper brushes, wire 877, both upper contacts R31B and R31A closed by the interlock relay called in by contacts 291 at the end of ejection, wires 883 and 888, relay contacts R21C now closed, wire 836 (Fig. 9d), pickup coil of relay R46, and wire 835 to line 321. With a heading card at the upper brushes, contacts R28C are opened to prevent two lines of spacing in order to eject directly to the first heading line.

Relay R46 then holds a circuit to the line spacing magnet LSM and skipping continues to the first body line D' as follows. For the first two spaces the circuit is through the lower R46A contacts and a complete circuit includes line 321 (Fig. 9b) magnet LSM, wires 807 and 808, relay contacts R348A, cam contacts PM9, relay contacts R344C, lower relay contacts R46A, wire 853 (Fig. 9c), relay contacts R41D, relay contacts R45C, wire 803, relay contacts R22A and R9D, wire 802, (Fig. 9d), post 12, interlock contacts 286, post 11, and wire 801 to line 320. When contacts R46A are transferred, the spacing circuit continues through upper contacts R46A, wire 811, upper contacts R35C remaining closed because the x and no x change is still effective, wire 809, relay contacts R45C, etc., as already traced. Relay R35 and the holding coil for relay R34 is held until cam point d opens contacts 498 to deenergize relay SE1 and open contacts SE1A in series with relay R34.

Assuming that ejection is to be caused also by a group change, then a plug wire connection is made between an unequal group control impulse socket such as 455 (Fig. 9i) to socket 842 (Fig. 9g) for picking up relays R17 and R42 (Fig. 9h) along wire 843 whenever card group numbers change. In Fig. 9e it is seen that relay contacts R17C are in series with another relay R43 which is then made effective to call for ejection. The circuit for relay R43 includes line 321, wire 827, relay R43, lower relay contacts R17C, wire 844, interlock relay contacts R31C, wire 845 to post 9 (Fig. 9d), wire 846 to post 11 and wire 801 to line 320.

Relay R43 then closes contacts R43A (Fig. 9g) in series with the eject magnet EM to call it into operation for a long feed advance. The eject circuit includes line 321 (Fig. 9f), magnet EM, relay contacts R352A which provide an interlock to delay for ejection at lower speed, cam contacts CB33, wire 840, switch S21, wire 838 (Fig. 9g), minor control contacts R64C closed after total printing, intermediate control contacts R69D closed after printing, relay contacts R43A, wire 848, wire 821 (Fig. 9d), post 12, interlock contacts 286, post 11 and wire 801 to line 320. Ejection then takes place to advance the record strip from form to form.

Before going into an explanation of the effect of the novel heading skip controls on the record feeding devices, it is believed well to point out some basic relationships between the cards of Fig. 1 and the record of Fig. 2. Assuming that the record has advanced to put the first line in the "A'" space at the printing line, then printing and line spacing of the record continues until the perforation 12 in card 3 (which is the last A card) is sensed and initiates a skipping operation which tends to carry over the "B'" space but is stopped at the first B' line by the control of perforation 11 in the B cards.

The B cards are listed and then the last card 6, through its perforation 12, again initiates a skip operation which is terminated at the first C' line.

The C cards are listed and then the last card 8, through the perforation 12 initiates another skip operation which is terminated at the first D' line.

If there were too many D cards to print their data on one form, an overflow condition would be detected at the bottom of the first form and this would initiate an eject cycle to advance the strip to the next first heading line, followed by skipping to the first body line of the second form, where listing would again continue until a group change and total printing cycle would initiate an eject operation to bring the third form into position for recording the second group of cards.

In the illustrative example shown in Figs. 1 and 2 a control break comes before an overflow from form 1, a total is printed on the line below the last detail line, and the carriage ejects to the first heading space of form 2 and stops. The three lines represented by the three A cards of group 2 are printed on the second form, the perforation 12 in the last card of the A set starting a skip operation, which in this case continues to heading space C', because there are no B cards with perforations 11 to cause the carriage to stop at the B' heading space. The control circuits by which the signal to stop the carriage in the B' heading space is ignored will be described presently.

Turning now to Figs. 6 and 7, the association of the settable carriage controls and the lines of record R, Fig. 2, may be pointed out.

The cam coinciding with pointer 266 determines the form length and is the control for stopping the record upon ejection so that it is stopped with the first line of heading block A' in printing position, i. e. no matter where ejection is started from, it ends with record R presenting the first line of the first heading at the print receiving line.

At the end of listing of the A cards, perforation 12 calls in space skipping operation which is brought to a halt by the cam point b (Fig. 7) unless absence of "B" cards rules otherwise.

In the same way points c and d open contacts 498 to stop skipping of space on record R at C' and D' respectively, unless absence of "C" cards call for direct motion to D'.

Line O on record R is the selected overflow line and when it appears, lever 274 (Fig. 6) is effective to close contacts 269 and initiate ejection.

The main purpose of the novel electrical controls is to overcome the action of the cam points b and c (Fig. 7) when they open contacts 498 to stop the skipping action. In other words, the points b and c call for record halting to receive headings B' and C', but the novel controls determine absence of B and C cards and place one or two shunts around contacts 498 to continue skipping past B' and/or C'.

The entire novel wiring controls shown in heavy lines in the wiring diagram comprise three main units, a control circuit unit, a setup circuit unit and a timing circuit unit, and they will be presented in that order.

It is the function of the control circuits to provide alternative circuits or shunts around contacts 498 for the holding coils of relays R34 and R35 during heading skipping operations. These three control circuits, Fig. 9d, consist of a series parallel connection of the contacts of relay SE1 for one, the contacts of relays SE3 and SE6 for the second, and the contacts of relays SE4 and SE7 for the third. When line selection switch LSR (Fig. 9c) is closed as shown, the line 800 to contacts 498 is made impotent and then magnet SE1 operated thereby and its contacts SE1A (Fig. 9d) act as a sort of proxy for contacts 498.

The SE1A contacts act as a holding point for relays R34 and R35 during operation of the automatic carriage to print all headings. The coil of magnet SE1 is energized by the contacts 498 and remains energized except for brief openings of the contacts by the cam points b, c, and d (Fig. 7). The circuit for magnet SE1 is as follows: line 321 (Fig. 9c), wire 850, magnet SE1, wire 800 (Fig. 9d), skip stop contacts 498, wire 815, post 814, a wire to "first card" contacts R9a (Fig. 9i), the R9 holding coil and wire 333 to line 321. Then relay SE1 not only closes contacts SE1A (Fig. 9d) for the skipping circuit to relays R34 and R35 traced hereinbefore, but it also closes contacts SE1B, SE1C, and SE1D (Fig. 9c) for effecting control over the timing relays SE7, SE8, and SE9 as pointed out hereinafter.

It is apparent that the three momentary openings of contacts 498 by cam points b, c and d, also affect relay SE1 to cause three momentary openings of contacts SE1A and the resulting deenergization of relays R34 and R35. Thus skipping is ordinarily stopped at the B' and C' first heading lines and at the D' first item line unless contacts SE1A (Fig. 9d) are shunted.

They are shunted in two ways. The SE3B and SE6B contacts together form a holding circuit during the action of the "b" cam point (Fig. 7) and at the time of the supposed appearance of the B heading cards which, if absent, cause closure of the shunt and continued skipping over the B' heading space to the first line of the C' heading space where the relay SE6 is dropped out.

For the second shunt, the SE4B and SE7B (Fig. 9d) contacts together form a holding circuit during the action of the "C" cam point (Fig. 7) and at the time of the supposed appearance of the C heading cards which, if absent, cause perfection of the shunt and continued skipping over the C' heading space to the first detail line D' where the relay SE7 is dropped.

In the two shunt circuits there is manifested the position of the controls in the automatic carriage as well as the arrangement of heading and detail cards in the tabulator. The relays SE3 and SE4 are tabulator controlled relays, relay SE3 being picked up by the presence of a "B" heading card, and relay SE4 being picked up by either a change from heading to detail cards or on an overflow condition. The relays SE6 and SE7 are carriage controlled relays which are picked up by a relay SE5 at the end of an ejection cycle and then dropped out seriatim by relays SE8 and SE9 at the first line of the "C'" heading space and then at the first line of the "D'" body space.

It is believed well to consider first the set up circuits for relays SE3, SE4 and SE5.

Relay SE3 is picked up by the reading at the upper brushes UB of the special perforation 11 in the B heading cards. The circuit includes line 320 (Fig. 9i), circuit breaker contacts CB1-4, wire 328, cam contacts CF17 and CF18, card lever relay contacts R2a, common brush 329, roller 330, then through a perforation 11 (Fig. 1) in a "B" card by an upper brush UB, a plug socket 446 and a plug wire to socket XR (Fig. 9b), relay contacts XR1A closed at the X timing, a pickup coil of relay SE3 and wire 851 to line 321. A second pickup coil of relay SE3 is provided for digit impulse operation not used as illustrated herein.

The holding circuit for relay SE3 is shown partly in Fig. 9c where the beginning of the circuit may be traced from line 321, through wire 850, coil SE3, contacts SE3A, wire 852 (Fig. 9d), post 12, interlock contacts 286, post 11 and wire 801 to line 320. Relay SE3 opens contacts SE3B to prevent skipping past the first B' heading line when B heading cards are present.

The energization of relay SE4 is effected in two ways. A change from a heading card with a perforation 10 (Fig. 1) to a detail card D with no x punching, requires a skipping operation to the first body line. Also an overflow condition requires skipping of the whole heading space on the second form to continue printing of subsequent detail cards on the first line D2 of the second body space.

The energization of relay SE4 according to the first of the conditions is effected through a series of relays R26, R27, R28 and R29. Relay R26 is picked up by the first special perforation 10 and prepares a circuit for relay R29 which is not perfected until relay R26 fails to pick up after the passage of the last heading card. The circuit for relay R26 (Fig. 9h) is as follows: from line 321, through wire 854, a pickup coil of relay R26, x control contacts XR20A, plug socket 855 and a plug wire to socket 856 (Fig. 9i), then through an upper brush UB and a perforation 10 in a heading card, roller 330, common brush 329, relay contacts R2a, cam contacts CF17 and CF18, wire 328, circuit breakers CB1-4 and line 320.

Relay R26 then closes contacts R26B (Fig. 9h) to call relay R27 into operation by a circuit from line 321, through wire 854, wire 857, the pickup coil of relay R27, contacts R26B, wires 858 and 859 (Fig. 9b), cam contacts CB29 and line 320. Relay R27 closes its contacts R27B (Fig. 9a) to prepare the holding circuit involving line 321, wire 860, holding coil R27, contacts R27B, wire 861 (Fig. 9c), cam contacts CF15 and line 320.

Turning back to Fig. 9h it is seen that relay R28 is picked up with relay R27 by a circuit including line 321, wire 862, the pickup coil of relay R28, digit transfer relay contacts DT20A, relay contacts R26B, wire 858 and wire 859 (Fig. 9b), cam contacts CB29 and line 320. A holding circuit for relay R28 involves line 321 (Fig. 9h), wire 862, the holding coil of relay R28, contacts R28B, wire 864, wire 865 (Fig. 9c), cam contacts CF15 and line 320. The pickup coil of relay R29 is energized through contacts R28B by the following connections: line 321 (Fig. 9h), wire 854, relay R29, wire 866, cam contacts CF29, relay contacts R28B, wires 864 and 865 (Fig. 9c) cam contacts CF15 and line 320. A holding circuit for relay R29 includes line 321 (Fig. 9h), wire 854, holding coil R29, relay contacts R29B, wire 859 (Fig. 9b), cam contacts CB29 and line 320.

The contacts of relays R26 and R29 have joint control over one of the pickup coils of relay SE4. Turning to Fig. 9a it is seen that one circuit for relay SE4 involves line 321, wire 868, the pickup coil of relay SE4, normally closed relay contacts SE2A, wire 869, relay contacts R29A and R29C now closed, normally closed contacts R26C, cam contacts CB31 and line 320. The foregoing circuit is established late in the last heading card sensing cycle due to the fact that relay R26 which has been dropped out after picking up relays R27, R28 and R29, is not again picked up by a following heading card at the upper brushes. Then the impulse from cam contacts CB31 goes through the normal points of relay R26 to relay SE4. Thus relay SE4 is energized by a change from heading to detail cards.

The other pickup coil of relay SE4 (Fig. 9d) is energized upon an overflow condition when there are too many detail items for one form length. This is done over a parallel circuit to the overflow control relay R46 which is picked up on all carriage listing overflow conditions as pointed out hereinbefore. The circuit includes line 321, Fig. 9d, wires 835, wire 870, pickup coil SE4, wire 871, wires 836 and 837 (Fig. 9e), relay contacts R20C (Fig. 9f), switch S21, wire 838 (Fig. 9g), relay contacts R41B, wire 821, post 12, contacts 286, post 11 and wire 801 to line 320.

The holding circuit for relay SE4 is through its own points SE4A and either SE1D or SE9B as follows: line 321 (Fig. 9d) wire 835, wire 870, the holding coil of relay SE4, contacts SE4A, wires 873 and 872 (Fig. 9c), and then either contacts SE1D, or wire 874, contacts SE9B and wire 875 to wire 876, and continuing through "first card" relay contacts R9D, wire 802, post 12, contacts 286, post 11 and wire 801 to line 320. Relay SE9 which is the last of a series of relays to be set upon ejection, finally deenergizes relay SE4 in preparation for renewed heading control after one sequence of operations.

Relay SE2 is used to prevent a back circuit in the controls for relay SE4 and in so doing takes advantage of the timing of relay R27. There are some ways of plugging which involve heading control from the group control relays. If the comparing relays such as R129 and R130 (Fig. 9i) are used to energize the heading control relay R30 (Fig. 9h) to detect a change from the final card of a heading group to the first card of a subsequent heading group, and if the heading control is plugged to the same pickup socket, then an unequal impulse could erroneously pick up relay SE4. However, since relay points SE2A are put in series with the pickup coil of relay SE4, and since relay SE2 is held energized by relay R27 until a time in the cycle when there is no delivery of unequal impulses, a back circuit is prevented thereby. The circuit for picking up relay SE2 includes line 321 (Fig. 9a) wire 860, relay SE2, relay contacts R27B, wire 861 (Fig. 9c), cam contacts CF15 and line 320. Thus relay contacts SE2A (Fig. 9a) are only closed in series with the pickup coil of relay SE4 when it is proper for an impulse to pass therethrough from cam contacts CB31, relay contacts R26C and relay contacts R29C and R29A as already noted.

Another part of the set up controls for the carriage involve the relay SE5 which is picked up on the completion of an ejection cycle and is thus adapted to start the seriatim controls for a new series of heading operations. This relay SE5 is provided with two pickup coils because the tabulator starting conditions involving the "first card in" controls are different than later when the tabulator is in regular operation.

For the "first card" pickup control of relay SE5 the circuit is as follows: line 321 (Fig. 9d) wire 835, wire 878, pickup coil P1 of relay SE5, wire 879 (Fig. 9c), relay contacts SE1D normally closed, relay contacts SE8A normally closed, wire 880, relay contacts R8c closed before the "first card in" operation, wire 881 (Fig. 9b), cam contacts PM1, wire 882, wire 809 (Fig. 9c), relay contacts R45C, wire 803, relay contacts R22A, relay contacts R9D, wire 802 (Fig. 9d) post 12, interlock contacts 286, post 11 and wire 801 to line 320. Thus the pickup coil will be energized together with the holding circuit of relay R8 at the midpoint of the cycle upon the entry of the first card under the lower brushes LB.

The other pickup coil of relay SE5 is picked up upon the closure of eject control contacts 291 (Fig. 6) which are already noted as indicating the end of an eject operation by their closure. The second pickup circuit involves line 321 (Fig. 9d) wire 835, wire 884, pickup coil P2 of relay SE5, switch LSF, wire 885, eject contact 291, post 9, wire 846, post 11 and wire 801 to line 320.

Relay SE5 is then held through its own contacts SE5B (Fig. 9d) and the contacts of relay SE1 as follows: line 321 (Fig. 9d) wire 835, wires 878 and 886, the holding coil of relay SE5, upper contacts SE5B, wire 887 (Fig. 9c), relay contacts SE1C, wire 876, relay contacts R9D, wire 802 (Fig. 9d), post 12, interlock contacts 286, post 11 and wire 801 to line 320. Relay SE5 serves to start a chain of timing controls over the picking up of relays SE6, SE7, SE8 and SE9 in a manner about to be set forth.

The last mentioned relays comprise a timing control which forms a sort of relay commutator with successively established circuits that are synchronized with the action of the automatic record feed carriage. It is already noted how relay SE5 is picked up at the end of a record ejection cycle. Having been picked up, relay SE5 then energizes magnet SE6 by the following means: line 321 (Fig. 9d), wire 835, wire 889, magnet SE6, wire 890, relay contacts SE5C now closed, wires 891 and 892 (Fig. 9c), relay contacts SE1B, wires 875 and 876, relay contacts R9D, wire 802 (Fig. 9d), post 12, interlock contacts 286, post 11 and wire 801 to line 321. Instead of passing through relay contacts SE1B the foregoing circuit may include relay contacts SE8C (Fig. 9c) which are also connected between wires 892 and 875.

Magnet SE6 is then held through its own lower contacts SE6A (Fig. 9d) and it also serves to pick up magnet SE7 by the following course: line 321 (Fig. 9d), wire 835, wire 894 (Fig. 9c), magnet SE7, wire 895 (Fig. 9d), relay contacts SE6D, wire 872 (Fig. 9c), then through either contact SE1D or SE9B and wire 875, wire 876, relay contacts R9D, wire 802 (Fig. 9d), post 12, contacts 286, post 11 and wire 801 to line 320. Magnet SE7 is then held energized by a holding circuit through its own contacts SE7A (Fig. 9c) and a wire 896 to contacts SE1D and SE9B.

At the first momentary deenergization of relay SE1 (i. e. when cam point b (Fig. 6) causes opening of contacts 498 upon the appearance of the first line of heading space B' (Fig. 2)) relay contacts SE1C (Fig. 9c) are opened to deenergize relay SE5 (Fig. 9d) and cause the dropping of contacts SE5B to allow relays SE8 to cut in when relay SE1 picks up again immediately thereafter. The pickup circuit for relay SE8 (Fig. 9c) involves line 321, wire 850, the pickup coil of relay SE8, wire 897 (Fig. 9d), relay contacts SE6B, wire 898, lower contacts SE5B, wire 887 (Fig. 9c) relay contacts SE1C, wires 875 and 876, relay contacts R9D, wire 802 (Fig. 9d), post 12, interlock contacts 286, post 11 and wire 801 to line 320. Relay SE8 is held over the latter part of the foregoing circuit through the closure of its own contacts SE8B and connection thereby to wire 850 to line 321 and wires 899 and 852 (Fig. 9d) to contacts 286.

At the second momentary deenergization of relay SE1 (i. e. when cam point c (Fig. 6) causes opening of contacts 498 upon the appearance of the first line of heading space C' (Fig. 2)) relay contacts SE1B (Fig. 9c) are opened to deenergize magnet SE6 (Fig. 9d) and cause the transfer of contacts SE6A to allow relay SE9 to cut in when relay SE1 picks up again immediately thereafter. Relay SE6 is not held through contacts SE8C because they have been transferred as already noted. The pickup circuit for relay SE9 (Fig. 9c) includes line 321, wire 900, the pickup coil of relay SE9, wire 901, relay contacts SE7C now closed, wire 902 (Fig. 9d), upper relay contacts SE6A, wire 892 (Fig. 9c), relay contacts SE1B, wires 875 and 876, relay contacts R9D, wire 802 (Fig. 9d), post 12, contacts 286, post 11 and wire 801 to line 320. Relay SE9 (Fig. 9c) is held through its contacts SE9A and wire 904 to wire 852 extending to post 12 and contacts 286.

At the third momentary deenergization of relay SE1 (i. e. when cam point d (Fig. 6) causes opening of contacts 498 upon the appearance of the first detail line of body space D' (Fig. 2)) relay contacts SE1D (Fig. 9c) are opened to deenergize magnet SE7.

From the foregoing it is apparent that relays SE6 and SE7 are picked up together to start a heading control operation and then dropped in succession after their useful terms are ended of providing shunts around contacts SE1A (Fig. 9d). The B contacts of relay SE6 are closed during passage of the B' heading space on the record so that they are available to continue skipping operation in the event of absent "B" heading cards. And the contacts SE7B are closed during the passage of the C' heading space on the record so that if relay SE4 picks up on an x to no x, or heading to detail change, it is a sign of absent "C" heading cards and the skipping circuit continues. Contacts SE7B are also closed upon ejection for timing with passage of all heading spaces, so that if relay SE4 is called in by an overflow condition, the shunt perfected by the contacts of both SE4 and SE7 is held to cause skipping of all headings and only opened by the third deenergization of relay SE1 at the first body line as mentioned in the last paragraph.

As a brief recapitulation of the different controls provided by the shunt connections shown on Fig. 9d, the following may be noted.

Stop and print all headings

This form of operation is effected through the action of relay contacts SE1A, both contacts SE3B and SE4B being opened.

Print A' and skip B' and C'

Skipping from the last line of the "A'" heading space to the first body line D' is under joint control of contacts SE4B picked up on a heading to detail card change, and contacts SE7B picked up for all headings but opened at the first body line.

Print A', skip B', and print C'

Skipping through the "B'" heading space is effected through contacts SE3B and SE6B, contacts SE3B remaining closed because of the lack of "B" cards and contacts SE6B remaining closed until the first line of space C' appears.

Print A' and B' and skip C'

Skipping from the last line of the "B'" heading space to the first body line D' is under joint control of contacts SE4B picked up on a heading to detail card change, and contacts SE7B picked up for all headings but opened at the first body line.

Skip all headings on an overflow

Relay contacts SE4B are closed as soon as an overflow condition is detected and held closed after ejection whereupon contacts SE7B are closed and held during skipping over all heading spaces and opened only on appearance of the first body line.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a card controlled machine for printing on a continuous record strip divided into forms, each form having a plurality of heading areas and a body area for detail lines of print, said control cards comprising one or more sets of heading cards and a set of detail cards in each group, there being first special indicia on the heading cards for distinguishing heading cards from detail cards, second special indicia for distinguishing the second set of heading cards from the others, and third special indicia for distinguishing the last card of each heading set from the others, means for sensing data indicia on said cards, means under control of said sensing means for printing on said strip, means for line spacing said strip, means for ejecting said strip from form to form, a cam means movable in synchronism with the advance of said strip, means for sensing said third special indicia, means under control of said third indicia sensing means for initiating operation of said line spacing means to start skipping at the end of each heading area, means under control of said cam means for disabling said line spacing means to stop space skipping at the first line of each heading area, means for sensing said second special indicia, means under control of said second indicia sensing means for counteracting said disabling means in the absence of a second set of heading cards to cause said line spacing means to continue space skipping past the second heading area, means for sensing said first special indicia, means under control of said first indicia sensing means for counteracting said disabling means in the absence of a third set of heading cards to cause said line spacing means to continue space skipping past the third heading area, means under control of said cam means for manifesting the appearance of the first line of the body area, means under control of said manifesting means for stopping space skipping at the first detail line, group change devices responsive to changes in group number indicia on the cards, means for detecting an overflow of detail items, and means under control of said group change devices and said overflow detecting means for initiating operation of said ejecting means to long feed the strip from form to form.

2. In a record controlled machine for printing on a continuous strip divided into forms with each form having a plurality of heading spaces and a detail space, said control records being divided into groups with one or more sets of heading records and one or more detail records in each group, means for printing lines of heading and detail data on said strip, means for line spacing said strip, means for initiating operation of said spacing means to skip strip intervals between heading and detail spaces, means for ejecting said strp from form to form, means for detecting an overflow condition of too many detail records for one form length, means under control of special indicia in a set of heading control records following the first set for preventing continued spacing of said strip when said following set is present, means under control of other special indicia distinguishing heading from detail cards to prevent continued spacing when more than two sets of heading records are present, said last mentioned means also being under control of said overflow detecting means to cause continued spacing past all heading spaces on an overflow condition, means under control of ejecting means for controlling the initiation of subsequent spacing and stopping controls, means for manifesting the position of the record at each of a plurality of first line stopping positions, a plurality of relays under control of said initiation means and said manifesting means and called into action seriatim to effect control according to one after the other of said first line positions of the record, and means cooperating with said spacing means to stop space skipping at one or more first heading lines under control of said preventing means and one of said seriatim relays and said distinguishing means with other of said seriatim relays.

3. In a record controlled machine for printing on a strip divided into forms, each form having three separate print receiving areas, said control records being divided into groups each related to a form, with two or three sets of records in each group, the set of records corresponding to the center area of said three areas being absent from some of the groups, means under control of said records for printing on said strip, means for feeding said strip to space the lines of print in said areas, means for controlling said feeding means to skip spaces between said areas, means for detecting the absence of said central sets of records, and means under control of said detecting means for controlling said skip and feeding means to skip over said central areas whenever the corresponding sets of records are absent.

4. In a record controlled machine for printing on a strip divided into forms, each form having four separate print receiving areas, said control records being divided into groups each related to a form, with two, three or four sets of records in each group, one or two sets of records corresponding to the two central areas of said four areas being absent from some of the groups, means under control of said records for printing on said strip, means for feeding said strip to space the lines of print in said areas, means for controlling said feeding means to skip spaces between said areas, means for detecting the absence of one or both of said central sets of records, and means under control of said detecting means for controlling said skip and feeding means to skip over one or the other or both of said central areas whenever the corresponding sets of records are absent.

5. In a record controlled machine for printing on a strip divided into forms, each form having a series of separate print receiving areas, said control records being divided into groups, each group related to a form, with a series of sets of records in each group which when complete is provided with a set of records for each area, but one or more sets of records are missing from some of the groups, means under control of said records for printing on said strip, means for feeding said strip to space the lines of print in said areas, means for detecting the absence of one or more of said series of sets of records, and means under control of said detecting means for controlling said feeding means to skip over one or more of the series of areas in each form whenever the corresponding sets of records are missing.

6. In a record controlled machine for printing on a sheet having a series of separate print receiving areas, said control records when complete having a corresponding series of sets of records, but one or more of said sets being missing, means under control of said records for printing on said sheet, means for feeding said sheet to space the lines of print in said areas, means for detecting the absence of one or more of said series of sets of records, and means under control of said detecting means for controlling said feeding means to skip over one or more areas related to the absent set or sets of records.

7. In a tabulator operated under control of groups of records for printing on a strip divided into forms for the various groups, each group of records including a plurality of sets of records and each form having separate print receiving areas for the different sets of a related group, group change devices for detecting changes in record groups, set change devices for detecting changes and absences of record sets within a group, means under control of said records for printing on said strip, means for line spacing said strip, means for long feeding said strip to eject from form to form, means for manifesting the position of said strip relative to the printing point to indicate the first line position of each area and the overflow line, means under control of either the group change devices on a change or the manifesting means on an overflow for controlling said long feeding means to eject the strip from form to form, and means under control of said set change devices and said manifesting means for controlling said line spacing means to skip from one area to the first line of the next area or past said area in the absence of a related set of records.

8. A machine of the kind set forth in claim 5 wherein said feed controlling means includes a plurality of cams for operating contacts to stop space skipping, a plurality of relays made operative by said detecting means on the absence of one or more sets of records, and a plurality of shunt circuits one or more of which are closed by said relays around said contacts to continue space skipping over areas related to missing record sets.

JONAS E. DAYGER.
ORVILLE B. SHAFER.

REFERENCES CITED

The following references are of record in the file of this patent:

UNITED STATES PATENTS

| Number | Name | Date |
|---|---|---|
| 1,946,915 | Pierce | Feb. 13, 1934 |
| 2,016,709 | Eichenauer | Oct. 8, 1935 |
| 2,056,391 | Daly | Oct. 6, 1936 |
| 2,131,919 | Mills | Oct. 4, 1938 |
| 2,357,456 | Bryce | Sept. 5, 1944 |
| 2,426,049 | Rabenda | Aug. 19, 1947 |